United States Patent
Colby et al.

(10) Patent No.: US 6,625,643 B1
(45) Date of Patent: Sep. 23, 2003

(54) SYSTEM AND METHOD FOR RESOURCE MANAGEMENT ON A DATA NETWORK

(75) Inventors: Kenneth W. Colby, San Diego, CA (US); Brian Kenner, Encinitas, CA (US); Michael McGinty, Coronado, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 09/438,336

(22) Filed: Nov. 13, 1999

Related U.S. Application Data

(60) Provisional application No. 60/108,326, filed on Nov. 13, 1998, and provisional application No. 60/108,597, filed on Nov. 15, 1998.

(51) Int. Cl.[7] ............................................. G06F 15/16
(52) U.S. Cl. ........................ 709/217; 709/218; 709/219; 709/223; 709/226; 709/231; 709/249
(58) Field of Search ................................. 709/217, 218, 709/219, 223–226, 231–232, 248, 249

(56) References Cited

U.S. PATENT DOCUMENTS

| | | | | |
|---|---|---|---|---|
| 5,930,473 A | * | 7/1999 | Teng et al. | 709/204 |
| 6,058,424 A | * | 5/2000 | Dixon et al. | 709/226 |
| 6,104,705 A | * | 8/2000 | Ismail et al. | 370/260 |
| 6,385,647 B1 | * | 5/2002 | Willis et al. | 709/238 |

* cited by examiner

*Primary Examiner*—Frantz B. Jean
(74) *Attorney, Agent, or Firm*—David H. Judson; Alphonso A. Collins

(57) ABSTRACT

A broadcast manager automatically commits resources and sets up network interconnections to produce a broadcast session on a data network. The broadcast manager automatically monitors usable network resources, tracks current data streams in the data network and tracks network resources that are used, by the current data streams to determine how resources are to be allocated. A system constructed according to the, invention may be used to provide multimedia distribution service that enables publishers to register multimedia presentations with the service and enables viewers to view these presentations.

12 Claims, 6 Drawing Sheets

IPS System Diagram

SYSTEM AND METHOD FOR RESOURCE MANAGEMENT ON A DATA NETWORK

CROSS-REFERENCE TO RELATED APPLICATIONS

This application claims the benefit of U.S. Provisional Application No. 60/108,326, filed Nov. 13, 1998 and U.S. Provisional Application No. 60/108,597, filed Nov. 15, 1998.

FIELD OF THE INVENTION

The invention relates to data networking and, more specifically, to a system and method for scheduling data streaming services and allocating associated system resources in a distributed data network environment.

BACKGROUND OF THE INVENTION

The Internet is a loose network of connected computers spread throughout the world. A message can be sent from any computer on the Internet to any other by specifying a destination address and passing the message from computer to computer via a series of "hops." Each computer, router, or "node" on the Internet has a unique Internet address. When an intermediate computer or router receives a message in transit, the computer checks the intended destination of the message and passes it along accordingly.

Initially, the Internet was primarily used to transmit and receive electronic mail and network news and to allow transfer of computer files. However, since the introduction of the World Wide Web (also known as the "Web" or "WWW") several years ago, the Internet has begun to host increasing amounts of other types of data of general interest, namely representations of images and articles, audiovisual and multimedia content, etc.

The Web protocol and language establish a graphical means to navigate the Internet. "Web pages," often consisting primarily of text and graphical material are stored on numerous computers, known as "Web servers," throughout the Internet. A software program known as a "browser" can be used to access and view Web pages across the Internet by specifying the location (i.e. Internet address) of the desired Web page. When a Web page is accessed, its information is transmitted from the remote computer (server or delivery site), wherever in the world it may be located, across the Internet, to the user.

In recent times, the Web has begun to host highly sophisticated types of multimedia content, such as audio and video data, and computer software. Compared to first generation Web content, namely text and still images, audio clips, video clips, and software programs have extremely high storage and bandwidth requirements.

As discussed above, a browser program can be used to access and view Web pages across the Internet by specifying the location (i.e. Internet address) of the desired Web page, or more commonly, by "hotlinking" to Web pages. Common browsers are, Lynx, NCSA Mosaic, Netscape Navigator, and Microsoft Internet Explorer. The desired Web page is specified by a uniform resource locator ("URL"), indicating the precise location of the file using the syntax "http://internet.address/directory/filename.html".

Web pages are generally described, in terms of layout and content, by way of a language known as "HTML" (HyperText Markup Language). Any particular computer linked to the Internet can store one or more Web pages, i.e. computer files in HTML format, for access by users.

Hotlinking from one HTML Web page to another is accomplished as follows. The user first accesses a Web page having a known address, often on the computer located at the user's ISP (Internet Service Provider). The ISP is the organization providing Internet connectivity to the user. That Web page can contains in addition to textual and visual data specified in HTML format, "links," or embedded information (in the form of URLs) pointing to the Internet addresses of other Web pages, often on other computers throughout the Internet. The user, by selecting a link (often by pointing and clicking with a mouse), can then access other Web pages, which can in turn contain farther data and/or additional links.

Various extensions to HTML, such as the EMBED tag, allow references to other data to be embedded into Web pages. Some browsers are not capable of handling data other than text and images. Other browsers can handle the data in various ways. NCSA Mosaic, for example, handles references to unknown types of data by allowing the data to be downloaded to the user's computer, and then optionally invoking an external program to view or manipulate the data. Recent releases of Netscape Navigator and Microsoft Internet Explorer take the concept one step further: a browser extension, or "plug-in," can be automatically invoked to handle the data as it is received from the remote Web page. Other means, such as network program "applets" written in the Java language (or a similar language), can be used to extend the functionality of the browser environment or network.

Traditionally, outside of the Internet, the primary method for communicating electronically with a substantial number of customers or users has been broadcasting. Radio, television, and other media all use various forms of broadcasting. Although it is possible to reach large numbers of people this way, it is difficult to regulate distribution and receipt of the content.

It is also possible to reach large numbers of customers by replicating content and sending individual copies to each customer. Printed matter, such as newspapers, magazines are distributed this way. Videotape rentals may also be considered to fall within this model. The Internet, while it uses electronic distribution like traditional broadcasting, acts in most cases more like the distribution of replicated content. Using the traditional model, Internet communications generally will not reach their intended destination unless they are specifically transmitted to that user. This method of reaching a large number of customers is inefficient, however, since audio and video transmissions over the Internet are bandwidth intensive.

Moreover, such methods of providing streams can be profoundly expensive at any level of data rate. The optimal configuration would be to know exactly how many streams are required to support the program for the attending audience. It's like building airliners for just the number of travelers of that day. If this were possible, airline travel would be significantly cheaper. Similarly, a unicast network configuration would also benefit with this type of planning optimization.

There is an Internet-based form of broadcasting, which in one embodiment is called "multicasting." In this case, an Internet-based communication can reach a large number of users, but can also be intercepted easily by individuals who are not authorized to do so. Internet broadcasts, like traditional television broadcasts, are difficult to regulate.

Conventionally, broadcast events are not effectively managed. For example, a broadcast stream may be accessible to anyone who logs into an associated Web page. Thus, there may be no control over who accesses the stream and there may be no control over how many people access the stream. In this example, the quality of the broadcast may suffer as a result of a degradation in the performance of the server that provides the stream. Accordingly, a need exists for an improved method of managing broadcast events over a data network.

SUMMARY OF THE INVENTION

The invention is directed to a system and method for managing the broadcast of data over a data network. To provide services for a scheduled broadcast event, a broadcast manager automatically commits system resources and sets up network interconnections for the broadcast. For example, the broadcast manager may automatically monitor usable network resources to determine which resources can be allocated. The broadcast manager may also track current data streams in the data network and track network resources that are used by those current data streams to determine how resources are to be allocated.

In one embodiment, a system constructed according to the invention provides multimedia distribution service that enables publishers to register multimedia presentations with the service and enables viewers to view these presentations. Network servers are provided for the publishers to load the presentations for viewing. Publishers can specify when a presentation is to be accessible. Publishers can specify which viewers are allowed to view the presentations. Viewers may log into the service using standard web browsers to view the presentations.

The system includes a broadcast manager as described above and other components such as a scheduler, a publisher, and a firewall tunnel server. The broadcast manager uses information obtained from the scheduler and the publisher to automatically commit resources and set up network interconnections to produce a broadcast session on the network. The scheduler performs the event scheduling when a publisher schedules an event (broadcast), provides information about event schedules, and tracks events as they take place. The publisher provides management services for publishers including initial signup, account maintenance, credit card processing, access and broadcast authorization, and usage tracking. The firewall tunnel server enables connections to be made from the server to the publisher in the event the connections are normally blocked by firewalls.

BRIEF DESCRIPTION OF THE DRAWINGS

These and other features of the invention will become apparent from the following description and claims, when taken with the accompanying drawings, wherein similar reference characters refer to similar elements throughout and in which:

DETAILED DESCRIPTION. OF PREFERRED EMBODIMENTS

The invention is described below, with reference to several detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
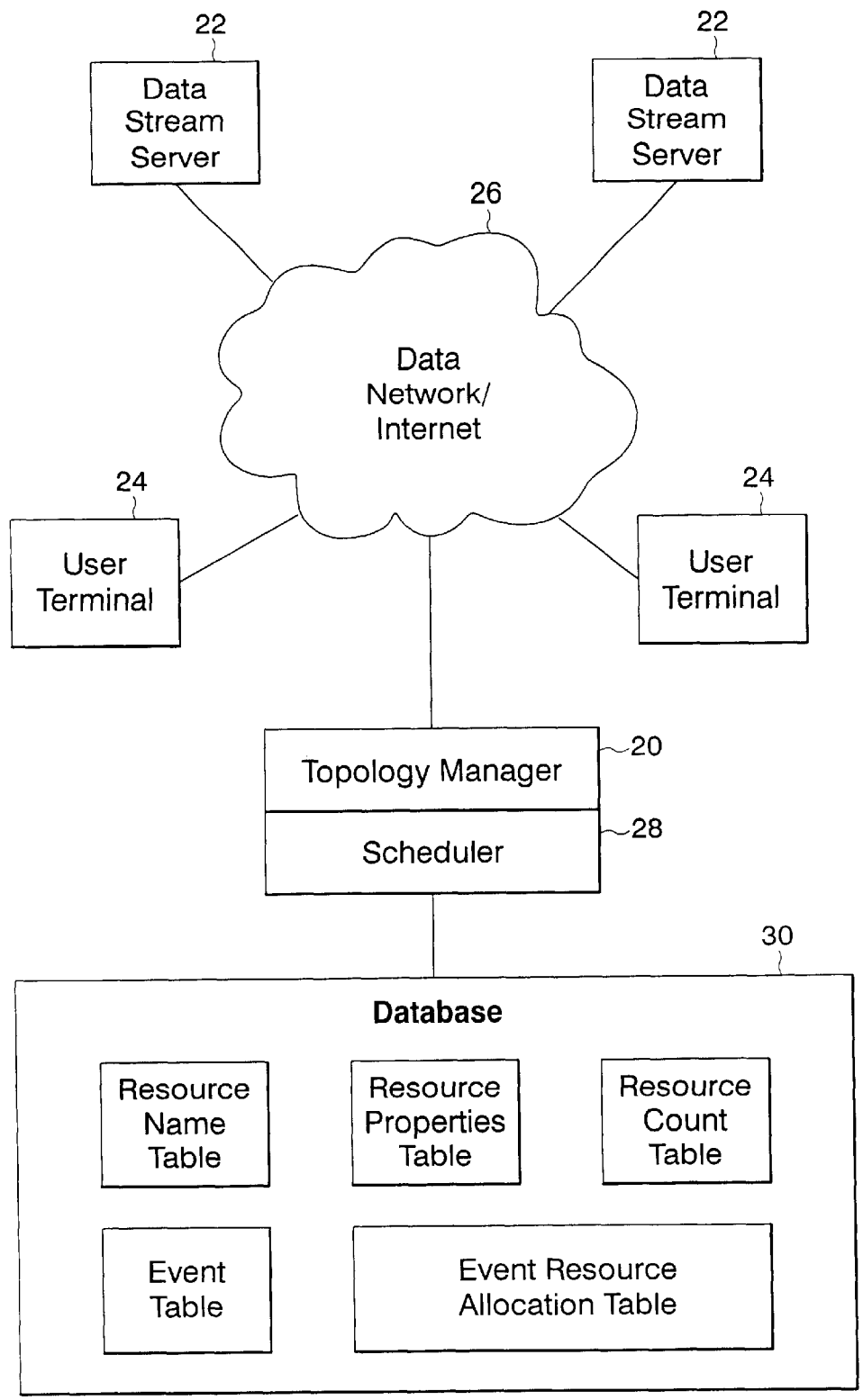
FIG. 1 is a block diagram illustrating one embodiment of a system constructed according to the invention.

FIG. 1 provides an overview of the main components of one embodiment of a system incorporating the teachings of the invention. A Topology Manager 20 manages broadcast events that are served from Data Stream Servers 22 to User Terminals 24 over a Data Network 26 such as the Internet. In one embodiment, the Topology Manager is a redundant set of software components that run on one or more Windows NT Workstation systems. The Topology Manager, using information obtained from a Scheduler 28, automatically commits resources and sets up network interconnections to produce a broadcast session on the system network. To track and allocate resources, the Topology Manager stores resource and event information in a Database 30.

Figure 2:
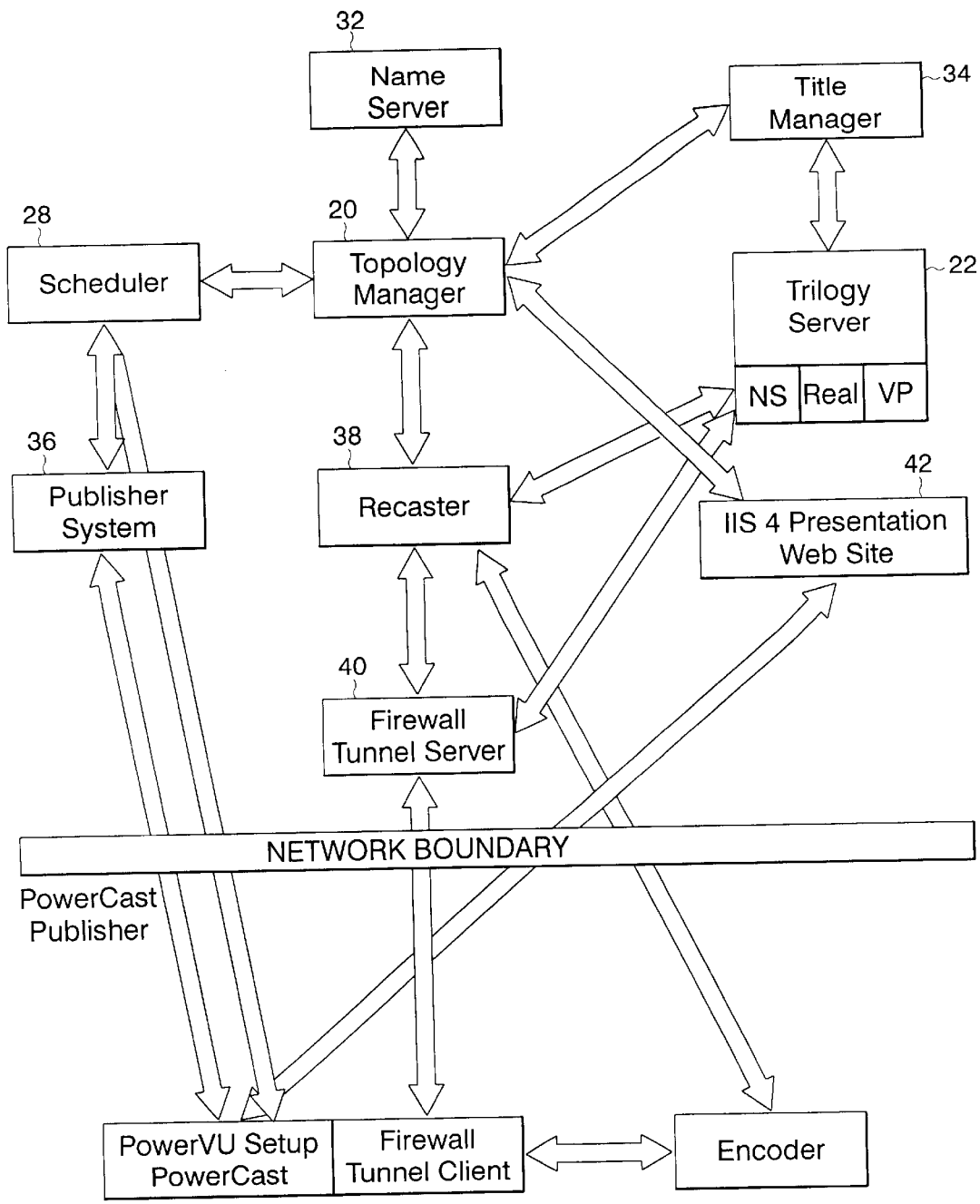
FIG. 2 is a block diagram illustrating another embodiment of a system constructed according to the invention.

FIG. 2 is a more detailed illustration depicting system components in another embodiment of the invention. FIG. 2 shows the relationship between the various components of the system during a presentation over the Internet with NetShow live video and audio. The Topology Manager 20 works closely with a Name Server 32, a Title Manager 34, a Publisher System 36, the Scheduler 28, a NetShow Recaster 38, a Firewall Tunneling Server 40, and a Presentation Web Site 42.

The Topology Manager performs several tasks, including the following:

1. The Topology Manager tracks all publisher streams currently on the system and the system resources they consume.
2. The Topology Manager tracks all usable resources in the system.
3. The Topology Manager receives new publishing point information from the Scheduler and wires the necessary resources into a network to publish the streams as specified by the publisher.
4. The Topology Manager creates a web page directory for PowerVU presentations and returns the URL and ftp information. It clears the directory after the presentation is complete or canceled.
5. The Topology Manager schedules the Title Managers and directs content to them.
6. The Topology Manager sets the presentation name URL in the Name Server to point to one or more video servers and web servers as needed.
7. The Topology Manager configures a Recaster and/or Firewall Tunnel if needed.
8. The Topology Manager starts and terminates the presentation.

The Topology Manager also has the following capabilities:

1. The Topology Manager is a redundant system that is capable of surviving a single point of failure and continue operating.
2. The Topology Manager will track the operation of other components of the network and will rewire the network if a component fails in a detectable manner.
3. The Topology Manager will rewire the network if the network operator takes a component out of service.
4. The Topology Manager will manage the network without operator intervention based on the rules setup by the network manager.

5. The Topology Manager will provide for and allow manual connection of network resources for specific purposes.
6. The Topology Manager has a web based user interface for operator functions.

With the above overview in mind, the operations of one embodiment of the components of FIG. 2 will now be treated in more detail.

NetShow Server Manager

A NetShow Server Manager, which runs on the Trilogy Server 22, will set up the broadcast parameters, and client validation parameters on the NetShow Server NS to start a live broadcast or to restart an archived broadcast. These parameters are passed to a Trilogy Server module from the Title Manager using a TCP/IP link. The Trilogy Server module will start and communicate with the NetShow Server Manager. The NetShow Server Manager will then pass the broadcast and client information to the NetShow Server as a connection. The NetShow Server will return ASF stream connection status and client connection and validation information to the NetShow Server Manager. The NetShow Server Manager will then validate or disconnect each client that connects to the NetShow Server.

The NetShow Server receives the connection to the ASF stream as a Virtual Root Object from the NetShow Server Manager. The Virtual Root Object contains the 'Alias Name' of the broadcast, the directory path, the maximum bandwidth, and the maximum client count. This ASF stream could be coming from one of four different sources; from a '.ASF' file on the server, directly from an encoder, from an encoder re-distributor, or from a Firewall Tunnel Module.

The NetShow Server will return client connection information as each client connects to server. The NetShow Server Manager will then check the client's right to be connected in the Publisher database. If the client is disallowed, the NetShow Server Manager will disconnect him. Any disallowed connections will be logged.

The NetShow Server Manager will communicate with the Trilogy Server using sockets. The NetShow Server Manager will communicate with the NetShow Server using the NetShow administration '.ocx' control and the client validation API.

NetShow Recaster Server Manager

A NetShow Recaster Server Manager resides on the Recaster Server 38. It receives connection information from the Topology Manager. The Recaster Manager sets up the link from the recaster to the Firewall Tunnel Server or the publisher's encoder. The NetShow Recaster Server Manager will communicate with the Topology Manager using one of the Win32 inter-process communications methods (mail slots or sockets). The NetShow Recaster Server. Manager will communicate with the Recaster Server using the NetShow administration '.ocx' control.

Topology Manager

The Topology Manager consists of two major sections. An operational section comprises a loadable program that creates and monitors the messaging systems, builds and maintains the resource database tables, performs the resource scheduling and communicates with the other network components. The user interface section of the program is a set of scripts implemented in Active Server Pages and Dynamic HTML. The user interface section of the program uses an Active X control to communicate with the operational section of the program through the message system. The user interface section also uses the database tables to pass information to the operational section.

The Topology Manager is redundant and able to survive a single point of failure. This is accomplished by having two or more Topology Managers running on separate computers in separate locations on the network. The Topology Managers will operate independently, but will forward all operational messages to the others so that each instance of the program can maintain an accurate resource database. The Name Server will choose which Topology Manager to send if the original message too. If a Topology Manager goes offline in the middle of a connection transaction, that transaction will be rolled back by the lowest numbered remaining Topology Manager and redone.

Each Topology Manager program will send the other Topology Managers 'HereIAm' messages at a configurable time interval. Should a configurable number of these messages be missed, the lowest numbered running Topology Manager will perform a connection check to assure that it is still in contact with the Scheduler and most of its resources. If this test passes, that Topology Manager will assume the operation of the current in-progress scheduling operation, if there is one, and inform the Name Server to redirect any messages to it. The Topology Manager will also maintain communications with all manager programs of any resources that it has allocated for connections using the same mechanism. Should that resource manager fail to respond, the topology manager will attempt to reestablish the connections to other resources.

If a Topology Manager finds itself isolated by a communications failure, it will continue sending. 'HereIAm' messages to, the other Topology Managers and the Scheduler with a status indicating the isolated state. If it first receives a response from an operational topology manager, it will perform a communications check. If the check passes, it will request a database transfer from the operational Topology Manager as described below in the Synchronizing Databases section. If it receives a response from the Scheduler and not other Topology Managers are present or operational, the Topology Manager will perform a normal startup as described in the Synchronizing Databases section below.

All operation request messages will be answered by an operation acknowledge message by all resource managers. The operation will be assumed to be complete when the acknowledgement message is received. Each Topology manager forwards each operation request and acknowledge message to the other Topology Managers in a 'forward' message wrapper. The other Topology Managers use the messages to update their databases and track the completion of operations by the originating Topology Manager. An original operation request may be sent to any Topology Manager at any time. It will be processed by the original receiver and forwarded to the other Topology Managers for tracking.

The Topology Manager synchronizes its database with the other Topology Managers when it starts operation. It will first establish contact by sending a 'HereIAm' message to the first Topology Manager in its list of Topology Managers and receiving in reply a 'HereIAmAck' message. If the other Topology Manager replies within the established timeout period and indicates an operating status, the newly started Topology Manager will send a request database transfer message (DBReq) to the running Topology Manager. The running Topology manager will complete any in-process requests and then transfer the database to the newly started Topology Manager. It will then send a database transfer complete message. (DBAck) to the newly started Topology Manager. The newly started Topology Manager will update its status to operational and begin normal operation. All system resource data that it needs will be in the transferred database.

If the all the other Topology Managers fail to reply, the newly started Topology Manager will send messages to each system component to build its resource utilization tables and will then send a 'HereIAm' message to the current scheduler and Name Server to indicate that it is operational. The Topology Manager will also check its current database to see if any events logged there might still be valid.

If the other Topology Managers reply that they not yet operational. The lowest numbered Topology Manager will continue the configuration process. The other Topology Managers will send a database transfer request message to the lowest numbered Topology Manager and wait for a database transfer acknowledge message.

Tracking Resources

The Topology Manager has a database table listing all resource controlling manager programs, the types of resources they control, and their 1P address or names. The Topology Manager will create tables of resources by polling the managers to see which are available. It will then request and receive resource report messages from them. It will create resource table entries from these report messages. The Topology Manager will mark the resources used as it assigns them to a scheduled event. It will free the resources at the conclusion or cancellation of the event.

The Topology Manager tracks the operation of any manager that it has assigned resources. It will receive and track the status fields of 'HereIAm' messages from each of these managers. If a manager fails to send a 'HearIAm' message before the assigned time out period or if the received 'HearIAm' message has a status field indicating an operation error, the Topology Manager will request resources from other managers and assign them to the event where it can. It will mark the previous resources as out-of-service until it receives a clear status from the manager of the resources.

Assigning Resources

The Topology Manager assigns the resources in the order that it has them in the resource tables. If it cannot fill the resources required for a scheduled event, it will schedule as many as it can for the event and return an error in the acknowledgment to the scheduler. It will also post an error status to the operator user interface.

Tracking Resource Transactions

The Topology Manager will record in a Log Table all incoming and outgoing messages for a time period specified in the Setup Table. This Log Table will be viewable from the web based manual interface.

Manual Operation

Manual operation of the Topology Manager can be implemented using ASP scripts and DHTML pages in IIS 4.0. Each Topology manager has its own user interface web site for manual operation. The web site will provide status, database table and scheduling functional views.

The web based manual interface will allow the operator to view the status of all resources available to the Topology Manager. It will allow the operator to view the status of any scheduled event.

The web based manual interface will allow the operator to view and edit any database table in the resource and event database tables. It will allow the operator to add managers to the resource manager tables and manually instruct the Topology Manager to poll them for available resources to add to the resource tables. It will allow the operator to remove managers to the resource manager tables and manually instruct the Topology Manager to remove the resources from the resource tables. It will allow the operator to change any parameter in the setup database for the program.

The web based manual interface will provide a set of pages that will allow the operator to schedule an event and assign resources to it manually. This view will also allow the operator to cancel any scheduled event created manually or automatically by a publisher.

Operation of the Topology Manager

The Topology Manager is an automatic program. It responds to messages sent to it by other applications or by its web based operator interface. This section will cover two basic scenarios, initial startup and synchronization, and a resource request by the scheduler.

Initial Startup

When the Topology Manager is started, it reada its setup database table. It will then run the synchronizing databases algorithm described in section 3.2.2 of this document. If the other Topology Manager is not available or indicated an non-operational status, the current Topology Manager will poll the resource managers in the Resource Name Table of the resource database to see if they are active and operational. The Topology Manager will then query each of the resource managers that report in using a streams count request message. The Topology Manager will build its Resource Count Table based on the replies. The Topology Manager will then go on line by sending a 'HereIAm' message to the Scheduler with an operational status.

Resource Request

The resource request scenario has two parts. For PowerVU presentations, the first part is requesting a web site URL. Regular broadcasts do not need this step. The second part is requesting the needed resources to be connected.

Web Site Request

When a PowerVU presentation is scheduled, the Scheduler sends a web site request message to the Topology Manager. The Topology Manager will locate a Web. Server resource in its Resource Name Table and create a subdirectory in the PowerVU web directory area of the web server. The directory name will be derived from the unique Event ID passed in the request message. The Topology Manager will then create a default lobby page for the event in the directory based on the event name passed in the request message. The Topology Manager will then send a web reply message to the Scheduler containing the complete URL of the lobby page. is The Scheduler application will return this to the publisher for distribution to selected viewers or posting for public viewers. The Topology Manager will not make any entry in its tables about this request.

Stream Resource Request

Figure 3:
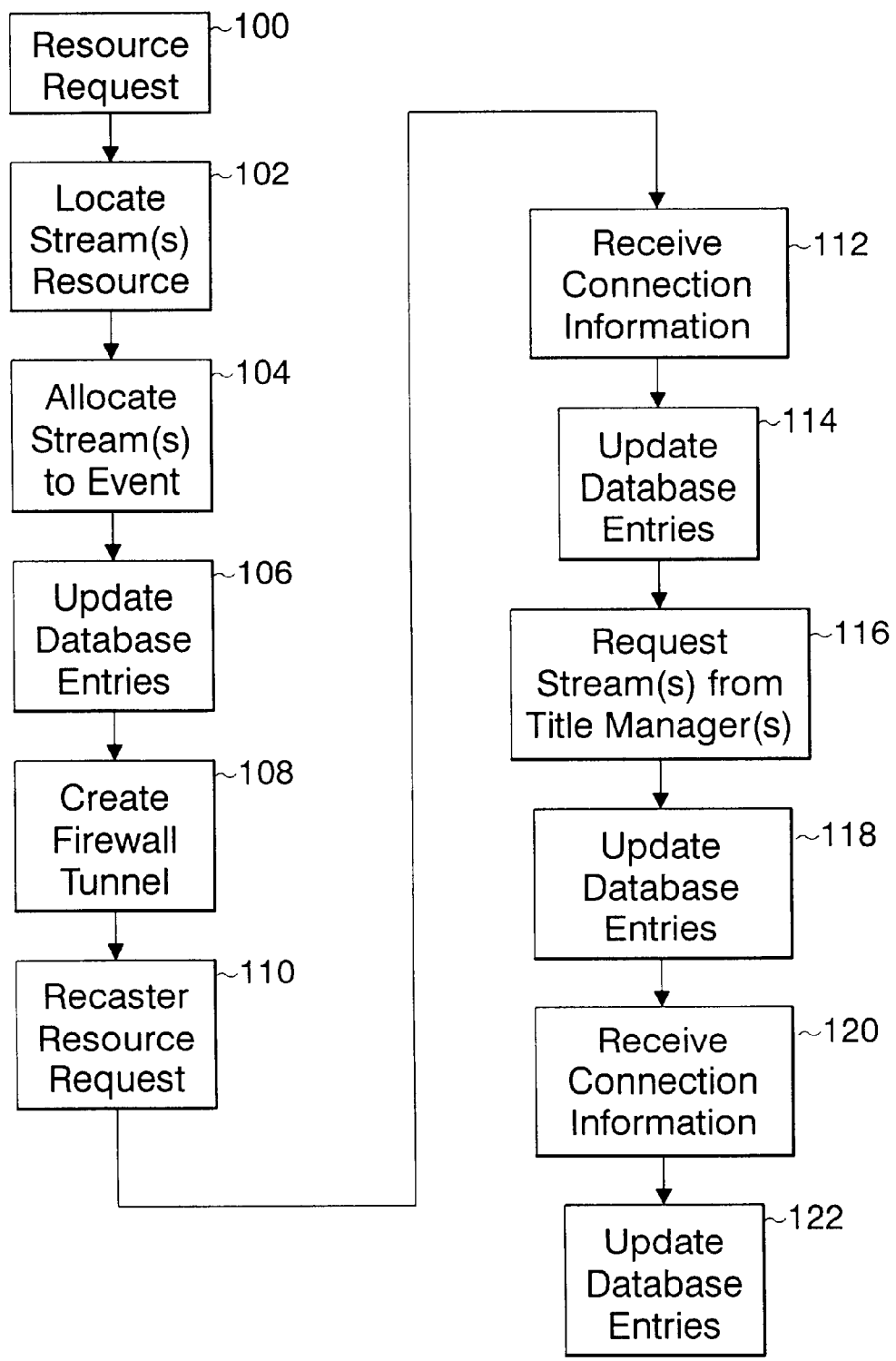
FIG. 3 is a flowchart illustrating stream resource allocation operations that may be performed by a system constructed according to the invention.

This operation is described in conmjunction with FIG. 3. When the publisher again contacts the Scheduler to start the presentation, the Scheduler sends a Resource Request message to the Topology Manager. Block 100. The Topology Manager will check the Resource Count Table in the Topology Database to find the required stream resources of the type requested. Block 102. For PowerVU this will be NetShow streams. If any streams are available, the Topology Manager will proceed to allocate them to the event. Block 104. The Topology Manager will first create an Event Table entry in the Topology Database for the event indexed by the unique EventID. It will then check if the web site has been created during the scheduling session. It will note the URL in the Event Table entry in the Topology Database. Block 106.

If a firewall tunnel is needed and indicated in the Request Resources message, the Topology Manager will locate the Firewall Server Manager in the Resource Name Table of the Topology Database. It will then send a Request Firewall Tunnel Server message to the Firewall Tunnel Server. The Firewall Tunnel Server Manager will respond with a Firewall Tunnel Acknowledge message containing both the client connection information and the recaster connection information. Block 108.

The Topology Manager will find the Recaster Manager in the Resource Names Table. It will then send a Recast Request Server message to the Recast Manager passing the firewall connection information and the recaster connection requirements in the request. Block 110. The Recaster Server Manager will send a Recaster Acknowledge message indicating the number of connection allocated and the address of the connections obtained from the Name Server. Block 112. The Topology Manager will create an entry in the Event Resource Allocation Table for the resources obtained from the Recaster Server Manager and will update the Resource Count Table for the assigned resources. Block 114. The Topology Manager will continue requesting resources from all the listed Recaster Server Managers until it fills its requirements or runs out of resources.

The Topology Manager will then proceed to request streams from the Title Managers based on the requested amount or the amount it can service based on the recaster services it obtained. Block 116. The Topology Manager will request the streams from the Title Managers using the Assigning Resources algorithm described above. The Topology Manager will send a Request Streams message to each Title Manager in turn. It will check each Streams Acknowledge message to see that it got the streams that it requested. It will make an entry in the Event Resource Allocation Table for each assigned resource from each Title Manager. Block 118. It will continue requesting stream resources from the Title Manager until the request is satisfied or until the resources are completely assigned. The Topology Manager will update the Resource Count Table with each assignment.

After the resources have been obtained, the Topology Manager will send a Resource Return message to the Scheduler who will relay the information to the Publisher. All messages from this session will be forwarded to the other Topology Manager, if it is available, to keep it in sync with the network. The Topology Manager will continue to receive connection information messages from the Title Managers during the event. It will forward the information to the Scheduler. Block 120 and 122.

Topology Manager Messaging System

This section describes the messaging systems used by the Topology Manager to communicate with the other components of the system network. This section describes the methods, content, and structure of the messages passed between the components.

Topology Manager to Topology Manager—Redundant System

The two Topology Managers will pass messages to inform each other of the status of the other system. The main message will be a regular heart beat message. Other messages will be used to keep the system databases in synchronization.

Communications 1.1.1.1.1 Technology

The Topology Manager will use Win32 Mailslots as its main method of communications with other WinNT based components.

1.1.1.1.2 Address

The addresses of the Topology Manager mailslots will be:
\\ComputerName\mailslot\topman 1.1.1.1.3 Messages The Topology Managers will send and receive the following system messages:

TABLE 1

| Message | Description |
|---|---|
| | 1.1.1.1.3.1 Outgoing |
| HereIAm | Main heartbeat message |
| HereIAmAck | Response to HereIAm. |
| Forward | Forward message received for other systems for database update. |
| DBReq | Request resource database transfer. |
| DBAck | Database Transfer complete message. |
| | 1.1.1.1.3.2 Incoming |
| HereIAm | Main heartbeat message |
| HereIAmAck | Response to HereIAm. |
| Forward | Forward message received for other systems for database update. |
| DBReq | Request resource database transfer. |
| DBAck | Database Transfer complete message. |

Topology Manager to Scheduler

The Topology Manager receives scheduling messages from the scheduler that request resources for a presentation event. The Topology Manager schedules the resources and replies with URL addresses needed to connect to the resources.

Communications 1.1.1.1.4 Technology

The Topology Manager will use Win32 Mailslots as its main method of communications with other WinNT based components.

1.1.1.1.5 Address

The addresses of the Topology Manager mailslots will be:
\\ComputerName\mailslot\topman
The address of the Scheduler mailslot will be:
\\ComputerName\mailslot\scheduler 1.1.1.1.6 Messages The Topology Managers will send and receive the following system messages:

TABLE 2

| Message | Description |
|---|---|
| | 1.1.1.1.6.1 Outgoing |
| HereIAm | Main heartbeat message |
| HereIAmAck | Response to HereIAm. |
| WebReturn | Return URL for event. Default lobby page created. |
| ResReturn | Return of URLs to resources for scheduled event. |
| EventStatus | Connection status for event. Sent asynchronously as viewer count changes. |
| | 1.1.1.1.6.2 Incoming |
| HereIAm | Main heartbeat message |
| HereIAmAck | Response to HereIAm. |
| WebReq | Request to setup web site directory. Done a schedule of event. |
| ResReq | Request resources for scheduled event. |
| StopEvent | Stop/cancel scheduled event. |

Topology Manager to Name Server

The Topology Manager will pass connection information from the redirector and the Firewall Tunnel Server to the Name Server. The Name Server will return connection information when requested.

Communications 1.1.1.1.7 Technology

The Topology Manager will use sockets as its method of communications with unix based components.

1.1.1.1.8 Address

The addresses of the Topology Manager named pipe will be:

TBD 1.1.1.1.9 Messages

The Topology Managers will send and receive the following system messages:

TABLE 3

| Message | Description |
|---|---|
| | 1.1.1.1.9.1 Outgoing |
| NameReq | Setup Names for these resources. |
| ClearName | Clear Names for these resources. |
| | 1.1.1.1.9.2 Incoming |
| NameAck | Return setup name. |
| ClearNameAck | Confirm name cleared. |

Topology Manager to Title Managers

The Topology Manager will request streams from the Title Managers and will pass Redirector Server or Firewall Tunnel Server connection information to the Title Managers to be forwarded to the NetShow Servers. The Name Server will return connection information when requested.

Communications 1.1.1.1.10 Technology

The Topology Manager will use sockets as its method of communications with unix based components.

1.1.1.1.11 Messages

The Topology Managers will send and receive the following system messages:

TABLE 4

| Message | Description |
|---|---|
| | 1.1.1.1.11.1 Outgoing |
| HereIAm | Main heartbeat message |
| HereIAmAck | Response to HereIAm. |
| ReqStreamCnt | Request a count of available streams. |
| ReqStreams | Request streams for a scheduled broadcast and connect server. |
| ClearStreams | Clear requested streams and connections. |
| | 1.1.1.1.11.2 Incoming |
| HereIAm | Main heartbeat message. |
| HereIAmAck | Response to HereIAm. |
| StreamCntAck | Return available stream count. |
| StreamsAck | Acknowledge stream request and return connection information. |
| StreamInfo | Return client connection information. (asynchronous messages) |

Topology Manager to Recaster

The Topology Manager will pass connection request information to the Recaster Manager to connect the recaster to a source coming from an encoder or Firewall Tunnel Server. The request will also specify the number of NetShow server connections needed.

Communications 1.1.1.1.12 Technology

The Topology Manager will use Win32 Mailslots as its main method of communications with other WinNT based components.

1.1.1.1.13 Address

The addresses of the Topology Manager mailslots will be:

\\ComputerName\mailslot\topman

The address of the Scheduler mailslot will be:

\\ComputerName\mailslot\recaster 1.1.1.1.14 Messages

The Topology Managers will send and receive the following system messages:

TABLE 5

| Message | Description |
|---|---|
| | 1.1.1.1.14.1 Outgoing |
| HereIAm | Main heartbeat message |
| HereIAmAck | Response to HereIAm. |
| ReqStreamCnt | Request a count of available streams. |
| RecastReq | Request recaster connection to encoder or Firewall Tunnel Server. |
| RecastClear | Stop recaster and release resources. |
| | 1.1.1.1.14.2 Incoming |
| HereIAm | Main heartbeat message |
| HereIAmAck | Response to HereIAm. |
| StreamCntAck | Return available stream count. |
| RecastAck | Acknowledge recast request with connection information for encoder. |
| RecastInfo | Return asynchronous connection information. |

Topology Manager to Firewall Tunnel Server

The Topology Manager will pass connection request information to the Firewall Tunnel Server Manager to expect a connection request from a Firewall Tunnel Client and to expect a connection request from a redirecter.

Communications 1.1.1.1.15 Technology

The Topology Manager will use Win32 Mailslots as its main method of communications with other WinNT based components.

1.1.1.1.16 Address

The addresses of the Topology Manager mailslots will be:

\\ComputerName\mailslot\topman

The address of the Scheduler mailslot will be:

\\ComputerName\mailslot\fwtserver 1.1.1.1.17 Messages

The Topology Managers will send and receive the following system messages:

TABLE 6

| Message | Description |
|---|---|
| | 1.1.1.1.17.1 Outgoing |
| HereIAm | Main heartbeat message |
| HereIAmAck | Response to HereIAm. |
| ReqStreamCnt | Request a count of available streams. |
| TunnelReq | Request a firewall tunnel connection. |
| | 1.1:1.1.17.2 Incoming |
| HereIAm | Main heartbeat message |
| HereIAmAck | Response to HereIAm. |
| StreamCntAck | Return available stream count. |
| TunnelAck | Acknowledge tunnel request with connection information for client. |
| TunnelInfo | Return asynchronous connection information. |

Message Definitions

The system messages are binary messages composed of two parts; a message header part, and a message content part. The message header is fixed length and has fixed field definitions. It is the same for every system message. The message content part is defined by the message number field in the message header and may have any amount of fields of any length. The length field in the header part contains the byte count of both parts of the message.

Message Header Definition

The message header has three fields, the message length field, the message number field, and the message source field. Each of these fields is a 32 bit integer. The header is always the first part of any message.

TABLE 7

| Field Name | Data Type | Definition |
|---|---|---|
| Length | DWORD | Length of complete message in bytes. |
| MsgNum | DWORD | Message number. Defines message type. |
| Sender | DWORD | Index of resource manager in resource manager table that sent message. |

Message Content Definitions

The content fields of each message are defined by the message number. The MsgNum field in the message header identifies each message type. Each message is described in the following paragraphs.

HereIAm Message

This message is used to indicate the continued operation and status of a resource. It is sent to interested components when the resource manager is started and is resent within a predetermined time limit there after.

TABLE 8

| Field Name | Data Type | Definition |
|---|---|---|
| Length | DWORD | Length = 16 |
| MsgNum | DWORD | Message number = 1 |
| Sender | DWORD | Index of resource manager in resource manager table that sent message. |
| Status | DWORD | Status of sender. Sender dependent definition. Zero indicates operational component with no errors. |

Forward Message

This message is used by the Topology Manager to forward messages to the other Topology Manager. The message length is dependent on the length of the forwarded message.

TABLE 9

| Field Name | Data Type | Definition |
|---|---|---|
| Length | DWORD | Length of forwarded message plus 12. |
| MsgNum | DWORD | Message number = 2 |
| Sender | DWORD | Index of Topology Manager in resource manager table that sent message. |
| Message | N/A | Complete message to be forwarded. |

Request Database Transfer Message (DBReq)

This message is used by the Topology Manager at startup to request that the running Topology Manager copy its current resource database (Topology.mdb) to its resource database.

TABLE 10

| Field Name | Data Type | Definition |
|---|---|---|
| Length | DWORD | Length = 12 |
| MsgNum | DWORD | Message number = 3 |
| Sender | DWORD | Index of resource manager in resource manager table that sent message. |

Database Transfer Complete Message (DBAck)

This message is used to indicate the successful or unsuccessful transfer of the resource database.

TABLE 11

| Field Name | Data Type | Definition |
|---|---|---|
| Length | DWORD | Length = 16 |
| MsgNum | DWORD | Message number = 4 |
| Sender | DWORD | Index of resource manager in resource manager table that sent message. |
| Status | DWORD | Status = 0, successful, Status = 1, unsuccessful |

Web Site Request (WebReq)

This message is used to request that a web site be allocated to an event by the Topology Manager.

TABLE 12

| Field Name | Data Type | Definition |
|---|---|---|
| Length | DWORD | Length = 116 |
| MsgNum | DWORD | Message number = 5 |
| Sender | DWORD | Index of resource manager in resource manager table that sent message. |
| EventID | DWORD | ID of event in publishers database. |
| EventName | ASCIIZ100 | Name of event for the default lobby page. |

Web Site Return (WebReturn)

This message is used to return the web URL.

TABLE 13

| Field Name | Data Type | Definition |
|---|---|---|
| Length | DWORD | Length = 416 |
| MsgNum | DWORD | Message number = 6 |
| Sender | DWORD | Index of resource manager in resource manage table that sent message. |
| EventID | DWORD | ID of event in publishers database. |
| WebURL | ASCIIZ100 | URL of the event default lobby page. |
| FtpURL | ASCIIZ100 | Ftp Address for .htm files. |
| FtpLogin | ASCIIZ100 | Login name for ftp transfer. |
| FtpPswd | ASCIIZ100 | Login password for ftp transfer. |

Resource Request (ResReq)

This message is used to request that resources be allocated to an event by the Topology Manager.

TABLE 14

| Field Name | Data Type | Definition |
|---|---|---|
| Length | DWORD | Length = 144 |
| MsgNum | DWORD | Message number = 7 |
| Sender | DWORD | Index of resource manager in resource manager table that sent message. |
| EventID | DWORD | ID of event in publishers database. |
| EventStart | Date/Time | Starting time and date of event |
| EventFinish | Date/Time | Finish time of event. |
| EventType | DWORD | Event type from publishers database. |
| NumConnects | DWORD | Number of expected connections to event. |
| FWTunnel | Yes/No | Firewall Tunnel Requested. |
| Encoder | ASCIIZ100 | Encoder Address on internet. |

Resource Return (ResReturn)

This message is used to return connection information to the requested event resources.

TABLE 15

| Field Name | Data Type | Definition |
|---|---|---|
| Length | DWORD | Length = 328 |
| MsgNum | DWORD | Message number = 8 |
| Sender | DWORD | Index of resource manager in resource manager table that sent message. |
| EventID | DWORD | ID of event in publisher database. |
| Status | DWORD | Status = 0 for successful allocation. 1 for partial, −1 for none |
| NumConnections | DWORD | Actual count of connections allocated. |
| ConnectAdr | ASCIIZ100 | Internet address of viewer connection. |
| WebURL | ASCIIZ100 | URL of Web site for presentation slides. |
| FWTunnelAdr | ASCIIZ100 | Internet Address of tunnel server. |
| FWTunnelPort | DWORD | IP Port for tunnel server |

Stop Event (StopEvent).

This message is used to stop an event (cancel or terminate). All resources are returned. All stored data is deleted.

TABLE 16

| Field Name | Data Type | Definition |
|---|---|---|
| Length | DWORD | Length = 16 |
| MsgNum | DWORD | Message number = 9 |
| Sender | DWORD | Index of resource manager in resource manager table that sent message. |
| EventID | DWORD | ID of event in publisher database. |

Event Status (EventStatus)

This message is used to inform the publisher how many viewers are currently watching the event.

TABLE 17

| Field Name | Data Type | Definition |
|---|---|---|
| Length | DWORD | Length = 24 |
| MsgNum | DWORD | Message number = 10 |
| Sender | DWORD | Index of resource manager in resource manager table that sent message. |
| EventID | DWORD | ID of event in publisher database. |
| NumConnections | DWORD | Number of allocated connections. |
| Viewers | DWORD | Number of actual connections. |

Request Stream Count (ReqStreamCnt)

This message is used to request count of available stream resources from the managers.

TABLE 18

| Field Name | Data Type | Definition |
|---|---|---|
| Length | DWORD | Length = 12 |
| MsgNum | DWORD | Message number = 11 |
| Sender | DWORD | Index of resource manager in resource manager table that sent message. |

Stream Count Acknowledge (StreamCntAck)

This message is used to return count of available stream resources from the managers.

TABLE 19

| Field Name | Data Type | Definition |
|---|---|---|
| Length | DWORD | Length = 16 |
| MsgNum | DWORD | Message number = 12 |

TABLE 19-continued

| Field Name | Data Type | Definition |
|---|---|---|
| Sender | DWORD | Index of resource manager in resource manager table that sent message. |
| StreamCnt | DWORD | Number of available streams. |

Request Streams (ReqStreams)

This message is used to request streams from the Title Managers.

TABLE 20

| Field Name | Data Type | Definition |
|---|---|---|
| Length | DWORD | Length = 130 |
| MsgNum | DWORD | Message number = 13 |
| Sender | DWORD | Index of resource manager in resource manager table that sent message. |
| EventID | DWORD | ID of event in publisher database. |
| EventType | DWORD | Event type from publisher database. |
| NumConnections | DWORD | Number of requested connections. |
| RecastAdr | ASCIIZ100 | Internet address of recaster. |
| RecastPort | DWORD | IP port used for recaster. (need? Or part of Inet Adr.) |

Streams Acknowledge (StreamsAck)

This message is used to acknowledge streams request and return connection information.

TABLE 21

| Field Name | Data Type | Definition |
|---|---|---|
| Length | DWORD | Length = 24 |
| MsgNum | DWORD | Message number = 14 |
| Sender | DWORD | Index of resource manager in resource manager table that sent message. |
| EventID | DWORD | ID of event in publisher database. |
| NumConnections | DWORD | Number of requested connections. |
| ActualNum | DWORD. | Number assigned this event. |

Clear Streams (ClearStreams)

This message is used to instruct the Title Managers to clear the streams for this event and release their resources.

TABLE 22

| Field Name | Data Type | Definition |
|---|---|---|
| Length | DWORD | Length = 16 |
| MsgNum | DWORD | Message number = 15 |
| Sender | DWORD | Index of resource manager in resource manager table that sent message. |
| EventID | DWORD | ID of event in publisher database. |

Stream Information (StreamInfo)

This message is used to return connection counts from the Title Managers.

TABLE 23

| Field Name | Data Type | Definition |
|---|---|---|
| Length | DWORD | Length = 24 |
| MsgNum | DWORD | Message number = 16 |
| Sender | DWORD | Index of resource manager in resource manager table that sent message. |
| EventID | DWORD | ID of event in publisher database. |
| NumConnections | DWORD | Number of allocated connections. |
| Viewers | DWORD | Number of actual connections. |

Request Recast Server (RecastReq)

This message is used to request recaster service from the Recaster Manager.

TABLE 24

| Field Name | Data Type | Definition |
|---|---|---|
| Length | DWORD | Length = 120 |
| MsgNum | DWORD | Message number = 17 |
| Sender | DWORD | Index of resource manager in resource manager table that sent message. |
| EventID | DWORD | ID of event in publisher database. |
| NumConnections | DWORD | Number of requested recaster connections. |
| TunnelAdr | ASCIIZ100 | Internet address of Firewall Tunnel Server or customer encoder. |

Recaster Acknowledge (RecastAck)

This message is used to acknowledge recast request and return connection information.

TABLE 25

| Field Name | Data Type | Definition |
|---|---|---|
| Length | DWORD | Length = 24 |
| MsgNum | DWORD | Message number = 18 |
| Sender | DWORD | Index of resource manager in resource manager table that sent message. |
| EventID | DWORD | ID of event in publisher database. |
| NumConnections | DWORD | Number of requested connections. |
| ActualNum | DWORD | Number of connections assigned. |

Recast Clear (ClearRecast)

This message is used to instruct the Recast Manager to clear the recast streams for this event and release their resources.

TABLE 26

| Field Name | Data Type | Definition |
|---|---|---|
| Length | DWORD | Length = 16 |
| MsgNum | DWORD | Message number = 19 |
| Sender | DWORD | Index of resource manager in resource manager table that sent message. |
| EventID | DWORD | ID of event in publisher database. |

Recaster Information (RecastInfo)

This message is used to return connection counts from the Recast Manager.

TABLE 27

| Field Name | Data Type | Definition |
|---|---|---|
| Length | DWORD | Length = 24 |
| MsgNum | DWORD | Message number = 20 |
| Sender | DWORD | Index of resource manager in resource manager table that sent message. |
| EventID | DWORD | ID of event in publisher database. |
| NumConnections | DWORD | Number of allocated connections. |
| ActualNum | DWORD | Number of actual connections. |

Request Firewall Tunnel Server (FWTunReq)

This message is used to request recaster service from the Recaster Manager.

TABLE 28

| Field Name | Data Type | Definition |
|---|---|---|
| Length | DWORD | Length = 16 |
| MsgNum | DWORD | Message number = 21 |
| Sender | DWORD | Index of resource manager in resource manager table that sent message. |
| EventID | DWORD | ID of event in publisher database. |

Firewall Tunnel Acknowledge (FWTunAck)

This message is used to acknowledge firewall tunnel request and return connection information.

TABLE 29

| Field Name | Data Type | Definition |
|---|---|---|
| Length | DWORD | Length = 228 |
| MsgNum | DWORD | Message number = 22 |
| Sender | DWORD | Index of resource manager in resource manager table that sent message. |
| EventID | DWORD | ID of event in publisher database. |
| Status | DWORD | Status = 0 for successful allocation. 1 for unsuccessful. |
| ClientConAdr | ASCIIZ100 | Internet address for client connection. |
| ClientConPort | DWORD | IP Port for client connection. |
| RecastAdr | ASCIIZ100 | Internet address recaster connection. |
| RecastPort | DWORD | IP Port of recaster connection. |

Firewall Tunnel Clear (FWTunClear)

This message is used to instruct the Recast Manager to clear the recast streams for this event and release their resources.

TABLE 30

| Field Name | Data Type | Definition |
|---|---|---|
| Length | DWORD | Length = 16 |
| MsgNum | DWORD | Message number = 23 |
| Sender | DWORD | Index of resource manager in resource manager table that sent message. |
| EventID | DWORD | ID of event in publisher database. |

DNS Name Request (NameReq)113334

This message is used to request DNS names for an event from the Name Server.

TABLE 31

| Field Name | Data Type | Definition |
|---|---|---|
| Length | DWORD | Length = 216 |
| MsgNum | DWORD | Message number = 24 |
| EventID | DWORD | ID of event in publisher database. |
| HostName | ASCIIZ100 | Title Mgr DNS Name. |
| ReplyAdr | ASCIIZ100 | Reply IP Adr or name of sender. |
| ReplyPort | DWORD | Reply IP Port Number. |

DNS Name Acknowledge (NameAck)

This message is used to acknowledge the name request and return the name.

TABLE 32

| Field Name | Data Type | Definition |
|---|---|---|
| Length | DWORD | Length = 220 |
| MsgNum | DWORD | Message number = 25 |
| EventID | DWORD | ID of event in publisher database. |

TABLE 32-continued

| Field Name | Data Type | Definition |
| --- | --- | --- |
| Status | DWORD | Status = 0 for success allocation. 1 for unsuccessful. |
| ConAdr | ASCIIZ100 | Internet address for client connection. |
| HostName | ASCIIZ100 | Title Mgr DNS Name. |

DNS Clear Name (ClearName)

This message is used to delete the name from DNS.

TABLE 33

| Field Name | Data Type | Definition |
| --- | --- | --- |
| Length | DWORD | Length = 216 |
| MsgNum | DWORD | Message number = 26 |
| EventID | DWORD | ID of event in publisher database. |
| ConAdr | ASCIIZ100 | Internet address for client connection. |
| ReplyAdr | ASCIIZ100 | Reply IP Adr or name of sender. |
| ReplyPort | DWORD | Reply IP Port Number. |

DNS Clear Name Acknowledge (ClearNameAck)

This message is used to acknowledge the deletion of the name from DNS.

TABLE 34

| Field Name | Data Type | Definition |
| --- | --- | --- |
| Length | DWORD | Length = 112 |
| MsgNum | DWORD | Message number = 27 |
| EventID | DWORD | ID of event in publisher database. |
| ConAdr | ASCIIZ100 | Internet address for client connection. |

HereIAmAck Message

This message is used to indicate the continued operation and status of a resource. It is sent in response to a HereIAm message.

TABLE 35

| Field Name | Data Type | Definition |
| --- | --- | --- |
| Length | DWORD | Length = 16 |
| MsgNum | DWORD | Message number = 28 |
| Sender | DWORD | Index of resource manager in resource manager table that sent message. |
| Status | DWORD | Status of sender. Sender dependent definition. Zero indicates operational component with no errors. |

The following sections describe the other main component of FIG. 2 and their associated operation with the Topology Manager.

Database Definitions

The Topology Manager uses two internal databases in Access (MSJet 3.5) format. The first is the TopManSetup.mdb, used to store local configuration information for each of the Topology Managers. The second is the Topology.mdb, which is used to store the current configuration of the InterVU network. The Topology.mdb file is stored in a directory shared to both Topology Managers. This is the file copied in response to the Request Data Transfer Message from the other Topology Manager when it starts up.

Setup Database (TopManSetup.mdb)

The setup database has only one table, Setup, which contain paths and parameters needed by this Topology Manager to reach the other Topology Manager. This table can be edited from the operator web site.

TABLE 36

Setup Table

| Field Name | Data Type | Description |
| --- | --- | --- |
| WhichAmI | Number/byte | Topology Manager number. |
| DBShareDir | Text 100 | Topology database shared directory name. |
| TopDBName | Text 50 | Set to Topology.mdb |
| BlankDBName | Text 50 | Set to TopologyBlank.mdb |
| SetupDBName | Text 50 | Set to TopManSetup.mdb |
| LogEnabled | Yes/No | Enable logging of messages. |
| LogRetention | Time/Date | Log retention time. Time before entries deleted from Log Table. |

Topology Database (Topology.-mdb)

The topology database has tables that reflect the current status of the entire InterVU network.

Resource Name Table

The resource name table contains the internet names of all the systems resources in the InterVU network. This table is used by the Topology Manager to poll for available resources. The initial entries are setup and maintained by the operator via the administrator web page.

TABLE 37

| Field Name | Data Type | Description |
| --- | --- | --- |
| NameIdx | Number/long | Primary index of entries. |
| DisplayName | Text 100 | The human readable name of resource; (Title Manager 1) |
| SenderID | Number/long | Index of adr in SysMsg database. |
| ResTypeIdx | Number/long | Index to resource properties table. |
| ReportIn | Yes/No | Present when polled. |
| ReportInTime | Time/Date | Time of last heart beat HereIAm. |
| TimedOut | Yes/No | Missing, recovery started. |
| HeartBeatTime | Number/long | Heart beat time in ms. |
| ResourcesUsed | Yes/No | Current has resources in use. |

Resource Properties Table

The Resource Properties Table contains information common to all resources of a type. This table is setup and editable from user interface via the administrator web page.

TABLE 38

| Field Name | Data Type | Description |
| --- | --- | --- |
| ResTypeIdx | Number/long | Primary index of entries. |
| DisplayName | Text 100 | The human readable type name of resource. |
| CommTypeIdx | Number/Long | Mailslot = 1, Sockets = 2. (CommType Table idx) |

Resource Count Table

The Resource Count Table contains the use and availability counts for this resource type controlled by this manager.

TABLE 39

| Field Name | Data Type | Description |
| --- | --- | --- |
| NameIdx | Number/Long | Name index of resource manager owning counts. |
| ResTypeIdx | Number/Long | Index to resource type. |
| Total | Number/Long | Total amount of this type controlled by this manager. |
| Reserved | Number/Long | Resources held in reserve. |
| InUseOther | Number/Long | Resource in use. Controlled elsewhere. |
| InUse | Number/Long | In use by this manager. |

Event Table

The Event Table contains all of the events currently using resources on the network.

TABLE 40

| Field Name | Data Type | Description |
| --- | --- | --- |
| EventId | Number/Long | ID passed by the scheduler for this event. |
| EventStart | Date/Time | Scheduled starting time and date of event |
| EventFinish | Date/Time | Scheduled finish time of event. |
| ActualStart | Date/Time | Actual starting time and date of event |
| ActualFinish | Date/Time | Actual finish time of event. |
| EventType | Number/Long | Event type from publishers database. |
| NumConnects | Number/Long | Number of expected connections to event. |
| FWTunnel | Yes/No | Firewall Tunnel Requested. |
| Encoder | Text 100 | Encoder Address on internet. |
| ConnectAdr | Text 100 | Internet address of viewer connection. |
| WebURL | Text 100 | URL of Web site for presentation slides. |
| FtpURL | Text 100 | ftp address of presentation slides. |
| FtpLogin | Text 100 | Ftp login name |
| FtpPswd | Text 100 | Ftp login password |
| RecastAdr | Text 100 | Recaster adr on internet. |
| RecastPort | Number/long | IP Port for recaster. |
| FWTunSvrAdr | Text 100 | Internet Address of tunnel server. |
| FWTunSvrPort | Number/Long | IP Port for tunnel server |
| FWTunCltAdr | Text 100 | Internet Address of tunnel client. |
| FWTunCltPort | Number/long | IP Port for tunnel client. |
| Viewers | Number/Long | Actual viewer count. |

Event Resource Allocation Table

The Event Resource Allocation Table contains the counts of all resources allocated to each event on progress.

TABLE 41

| Field Name | Data Type | Description |
| --- | --- | --- |
| EventId | Number/Long | ID in Event Table of event using resources. |
| NameIdx | Number/Long | Name index of resource manager owning resource. |
| ResTypeIdx | Number/long | Index to resource type. |
| InUse | Number/Long | Resources allocated to this event |
| ConfirmedUsed | Number/Long | Number of resources reported to be in use. |

Database Schemas

The system table contains one record holding various system configuration parameters.

| Field Name | Data Type | Description |
| --- | --- | --- |
| MaxFreeStreamHours | Number | Number of free stream-hours allowed in a schedule timeslot |
| MaxTotalStreamHours | Number | Number of overall stream-hours allowed in a schedule timeslot |
| PreEventPadTime | Number | Number of additional minutes allowed before broadcast |
| PostEventPadTime | Number | Number of additional minutes allowed after broadcast |

The TimeSlots table contains an entry for each available time slot.

| Field Name | Data Type | Description |
| --- | --- | --- |
| TimeSlotID | AutoNumber | Primary Key |
| Time | Date/Time | Start time of this interval |
| FreeStreamHours | Number | Number of complementary stream-hours booked in this slot |
| TotalStreamHours | Number | Number of total stream-hours booked in this slot |
| MaxFreeStreamHours | Number | Maximum complimentary stream-hours allowed |
| MaxTotalStreamHours | Number | Maximum total stream-hours allowed |
| NumEvents | Number | Number of events currently scheduled |

The Publisher table contains a record for each publisher user. An account may have multiple publishers, at least one of which must be an admin.

| Field Name | Data Type | Description |
| --- | --- | --- |
| PublisherID | AutoNumber | Primary Key |
| UserName | Text | InterVU login name |
| Password | Text | InterVU Password |
| FirstName | Text | User Information |
| MiddleInitial | Text | User Information |
| LastName | Text | User Information |
| Address1 | Text | User Information |
| Address2 | Text | User Information |
| Address3 | Text | User Information |
| City | Text | User Information |
| State | Text | User Information |
| Country | Text | User Information |
| Zip | Text | User Information |
| Email | Text | User Information |
| Phone | Text | User Information |
| FAX | Text | User Information |
| BillingPlanID | Number | Foreign Key to Billing Plan table |
| IsActive | Yes/No | Is publisher currently allowed to use the system |
| IsAdmin | Yes/No | Is this publisher an account administrator |
| IsSubAccount | Yes/No | Is this publisher part of another account? |
| MasterID | Number | Key to record in this table of master (if above = Yes) |
| PeriodStartDate | Date/Time | Membership start date |
| NumPeriodsPurchased | Number | Number of periods purchased |
| StreamHoursAllotted | Number | Stream-hours allotted at period start (master only) |
| StreamHoursUsedForPeriod | Number | Stream-hours used by this publisher in this period |
| StreamHoursUsedTotal | Number | Stream-hours used by this publisher for all time |
| CookieSaved | Yes/No | Flag to indicate if the publisher system accepted a cookie |
| CreateDate | Date/Time | Date and time publisher created |
| LastLoginDate | Date/Time | Date and time last login by this publisher |

The Events table contains information about scheduled PowerVU presentations.

| Field Name | Data Type | Description. |
| --- | --- | --- |
| EventID | AutoNumber | Primary Key |
| EventTypeID | Number | Pointer to record in event type table |
| PublisherID | Number | Foreign key to publisher table |

-continued

| Field Name | Data Type | Description. |
|---|---|---|
| GUID | Text | Globally Unique Identifier provided by PowerPoint |
| Title | Text | Title of presentation |
| StartDateSched | Date/time | Scheduled start time/date |
| StopDateSched | Date/time | Scheduled stop time/date |
| StartDateActual | Date/time | Actual start time/date |
| StopDateActual | Date/time | Actual stop time/date |
| EventStatusID | Number | Foreign key to event status table |
| ReasonCode | Number | Error code |
| TimeReserved | Number | Number of minutes reserved |
| SeatsReserved | Number | Number of seats reserved |
| SecurityLevel | Number | Level of security for this event (level definition TBD) |
| IsPrivate | Yes/No | Is broadcast private |
| IsListed | Yes/No | Is broadcast listed |
| WebURL | Text | URL of event |
| FTPURL | Text | URL of ftp location to drop slides |
| FTPDirectory | Text | Directory to change to after FTP connection made |
| FTPUserName | Text | Login name of FTP user |
| FTPPassword | Text | Login password of FTP user |
| NetShowServerName | Text | Name of Netshow server |
| LocalPath | Text | Path to publisher's local content files |
| EncoderPath | Text | Path to content encoder |
| FWTunnel | Yes/No | Firewall tunnel to be used? |
| FWServerPath | Text | Firewall tunnel server location |
| FWServerPort | Number | Firewall tunnel server port |
| NumConnections | Number | Number of current viewer connections |
| MaxConnections | Number | Number of connections allowed before system denies viewers. |
| CreateDate | Date/Time | Date/time this record was created |

EventStatus is a lookup table to descriptions of status codes stored in the Event table.

| Field Name | Data Type | Description |
|---|---|---|
| EventStatusID | AutoNumber | Primary Key |
| Description | Text | 1 = Pending<br>2 = Uploading Slides<br>3 = Waiting Start<br>4 = Started<br>5 = Finished<br>6 = Cancelled by user<br>7 = Cancelled by Host |

EventType table includes records used to describe the type of Event. Currently, the PowerPoint 2000 event is the only supported type.

| Field Name | Data Type | Description |
|---|---|---|
| EventTypeID | AutoNumber | Primary Key |
| Description | Text | 1 = PowerPoint 2000 |

User Interface

The Topology Managers will have a web based user interface. This user interface is designed to use all the DHTML features of IE 4 and will require it's use for administrative purposes.

Status View

The Status View home page will contain a pictorial view of the components of the system with use and availability summaries. Clicking on a component pictorial will load the detail status page for that component. Clicking on the event icon will produce a list of events currently running. Clicking on the event name will produce a report of resources allocated to and used by the event. The Status View home page will contain the entry point to the Manual Operation home page.

Manual Operation

The Manual Operation home page will contain pictorial representations for the various database tables that can be edited by the operator and for the messages he can compose to allocate or release resources. The operator may edit any of the operational tables created by the Topology Manager. The operator will be warned when editing tables that might be in use and could cause system problems. The operator will be able to add, disable or delete resources at any time. The system will attempt to automatically reallocate any needed resources that are disabled or deleted.

The operator will be able to create an event manually for use or test purposes. The operator will be able to cancel a running event. The operator may reserve or release resources on any server.

NetShow Server Manager

The NetShow Server Manager resides on the Trilogy Server along with a service program that connects to the Title Manager associated with the Trilogy Server. It is one of three server managers, one for each of the three video servers resident in the computer.

Structure

The NetShow Server Manager is a stand-alone program that uses the supplied NetShow Management OCX control and COM interface to communicate with the NetShow Server. The NetShow Server Manager communicates with the resident part of the Title Manager using bi-directional named pipes.

NetShow Recaster Server Manager

The NetShow Recaster Server Manager is the same program as the NetShow Server Manager with different startup parameters. It communicates directly with the Topology Manager using a mailslot instead of sockets. The interface to the NetShow Server used in recaster mode is identical to the one used in the NetShow Server Manager. The messages sent and received from the Topology Manager are described in section 3.4.5 of this document.

Figure 4:
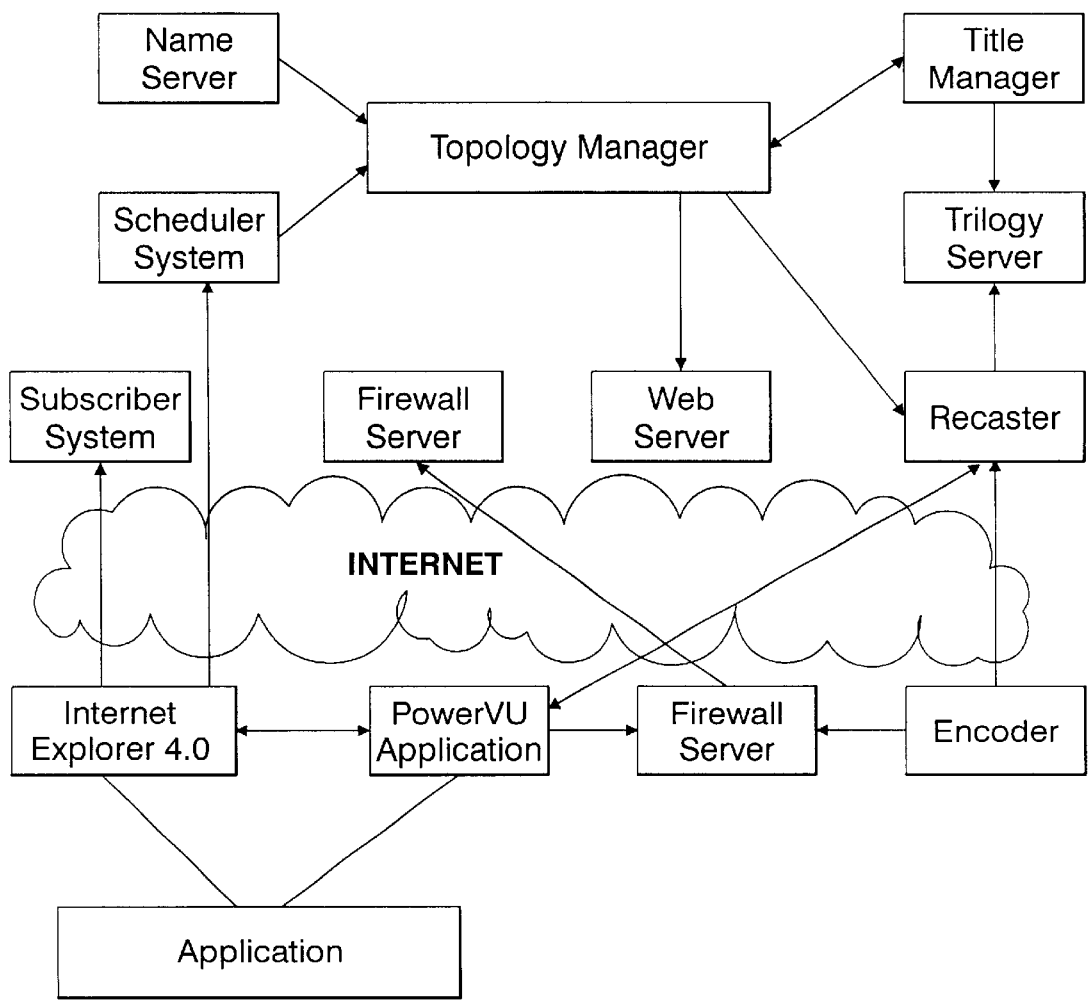
FIG. 4 is a block diagram illustrating another embodiment of a system constructed according to the invention.

FIG. 4 illustrates major components of another embodiment of a network distribution system constructed and implemented according to the invention. There are three general types of users of the network:

Publishers—people who provide content

Viewers—people who access or view content

Administrators—people who manage the system

In one embodiment, the Publisher is a PowerPoint 2000 user that wishes to make a presentation on the Internet using the PowerVU service. The publisher software includes PowerPoint 2000 software to run on the Publisher's system as well as software on the InterVU servers to provide this capability.

Viewers are users who view the broadcasts made by publishers. Viewers may be anonymous or registered. Viewers connect to a broadcast through a URL. URLs that identify broadcasts are generated when the broadcast is scheduled and given to the publisher. They may also be optionally listed on the PowerVU web site if the publisher wants to make his broadcast public. For private broadcasts it is up to the publisher to supply the broadcast URL to his viewers. In one embodiment, there is no special software required by the viewer. The presentation is viewed using, for example, Internet Explorer 4.0 or greater or Netscape Navigator 4.0 or greater with Microsoft's Media Player.

Administrators manage the network. Several of the network components discussed later in this document have administrative interfaces to provide configuration and database maintenance functions. The administrative functions provided are briefly described in the sections of this specification describing those components. In general, all administrative interfaces are web based.

There are two major types of services provided: broadcast and on-demand. For example, broadcast services include PowerPoint 2000 PowerCast presentations.

Broadcast services are live presentations made over the Internet. PowerPoint 2000 initiated broadcasts include PowerPoint slides, and optional audio and video. Other types of broadcasts may include audio/video only-or PowerPoint 97.

On-demand presentations are captured presentations stored on the InterVU network and made available on-demand to viewers. On-demand services may include recording, storage, monitoring and other functions.

Operational Overview

The Publisher has three entry points into the system: Through PowerPoint 2000 when scheduling a broadcast; through PowerPoint 2000 when beginning a broadcast; and from the World Wide Web.

Scheduling a Broadcast

Broadcasts may be scheduled through PowerPoint or in another embodiment, directly from the PowerVU web site. When the PowerPoint 2000 user chooses to schedule a broadcast over the Internet, PowerPoint sets up the appropriate information about the broadcast and connects the user, through Internet Explorer 4.0 or greater to a special PowerCast page on microsoft.com. From there the user selects a third party broadcaster. If InterVU is selected the user will be connected to the PowerVU web site and the parameters about the broadcast will be passed through the URL.

If the user is already registered with InterVU, and has allowed a cookie to be stored on his machine that identifies him, he will be taken directly to the schedule broadcast screen. If not, he is asked to log in if he has an InterVu account, or register as a new user if he does not. See the description of the Subscriber System for more details on registration.

Once the user has been identified and logged in he is presented with a series of screens to schedule the broadcast. Once the user has completed the scheduling, he is returned to PowerPoint.

Beginning a Broadcast

Performing a broadcast is a cooperative effort between PowerPoint and the InterVU software. In one embodiment, the broadcast is started from within PowerPoint 2000. When the PowerPoint 2000 user chooses to begin a broadcast, PowerPoint creates the HTML versions of the slides locally and connects the user, through Explorer 4.0 or greater, to the special PowerCast page on Microsoft.com. From here the user selects a third party. In one embodiment, the server may record which vendor the broadcast was scheduled with so that the user will not have to select the vendor a second time. In another embodiment, users who have not scheduled broadcasts with InterVU may get directed to InterVU anyway. If InterVU is selected the user will be connected to the PowerVU web site and the parameters about the broadcast will be fits passed through the URL. One of these parameters will indicate that this is a Begin Broadcast as opposed to a Schedule Broadcast. If the user has cookies enabled, and is known to InterVU (in the database) the user will be automatically logged on. If the broadcast is known (has been scheduled) the system will begin the broadcast setup process. If not, the system will offer to schedule the broadcast for immediate or future broadcast.

Connecting through the World Wide Web

The user may also connect to InterVU through the PowerVU Website. From here, it is possible to learn about the services offered, become a subscriber, get information about public broadcasts that have been scheduled, reschedule a broadcast, cancel a broadcast, delete a recorded broadcast, or maintain a subscriber account.

The PowerVU ActiveX control is downloaded the first time the user schedules a broadcast with InterVU, and updated automatically when changes are made to it by InterVU. This control provides the additional functionality required to connect PowerPoint with the InterVU network and to manage the broadcast.

The PowerVU website contains all of the web based user interfaces for PowerVU services. The website may be entered from the World Wide Web, or from PowerPoint via Microsoft.com.

Publisher System

The publisher system provides management services for publishers including initial signup, account maintenance, credit card processing, access and broadcast authorization, and usage tracking. The publisher system also includes an administrator interface for use by personnel in administrating the system.

In order to publish content on the system users may register through the publisher web pages. Users provide a login and password they use to access the system in the future, and may optionally allow the system to record this information in a cookie on their system to make the login automatic.

Publishers may be account managers or just users. For individual accounts there is only one user, who, by definition is the account manager. For corporate accounts an account manager may define other publishers who can use the system under the same billing plan: These additional users may or may not be granted administration privileges. Account managers may add and delete new users.

The Publisher System will implement all of the web pages and all of the underlying database applications to create and manage subscriptions and purchase orders. It also includes interfaces to other parts of the system for managing users and tracking usage. The Publisher System also includes an administration interface for use by InterVU personnel which is used for managing accounts and generating reports including the generation of a usage reconciliation report in both printed and binary form for input to the Solomon accounting system.

The Publisher system provides functionality for publishers to sign-up, perform account maintenance, and to schedule and broadcast audio and video presentations over a network to local and remote viewers.

Users access the Publisher System entirely from a Web based and Web hosted ActiveX interface. The Web system uses Microsoft IIS Server 4.0 and Active Server Pages (ASP) technology to provide database connectivity and scripting functions.

Figure 5:
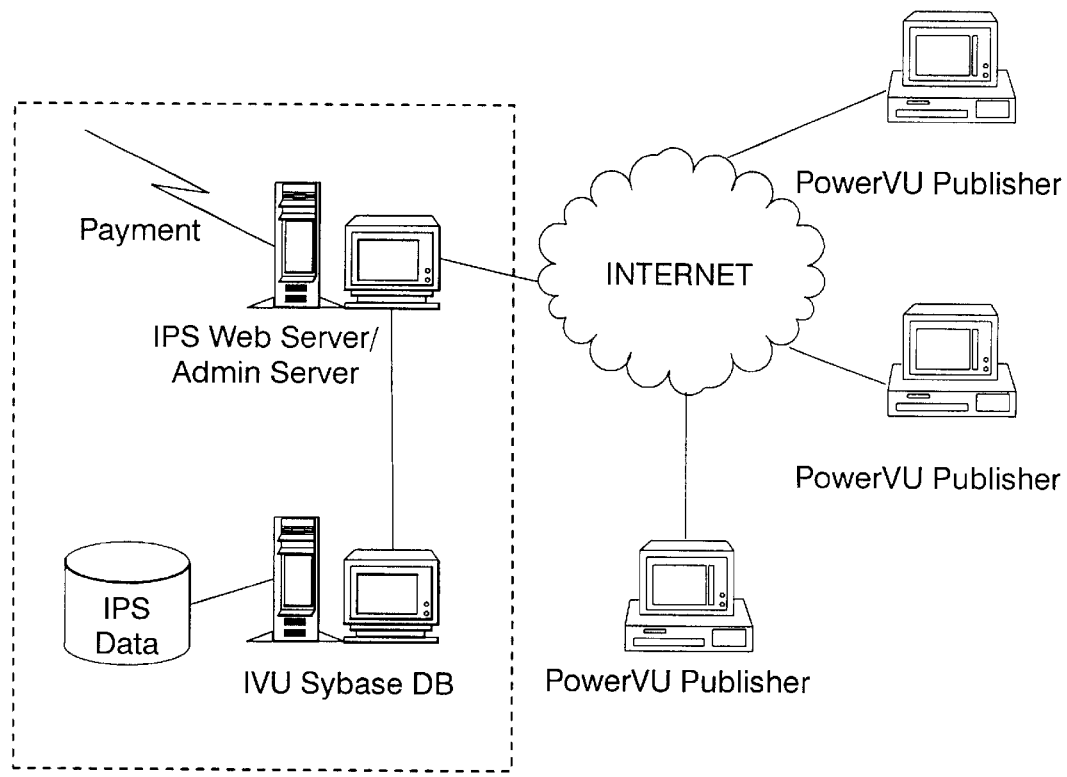
FIG. 5 is a block diagram illustrating another embodiment of a system constructed according to the invention.

FIG. 5 shows an one configuration for the Publisher System (IPS). Publishers are on the Internet, whereas the IPS Web Server, and IVU database are situated locally.

Figure 6:
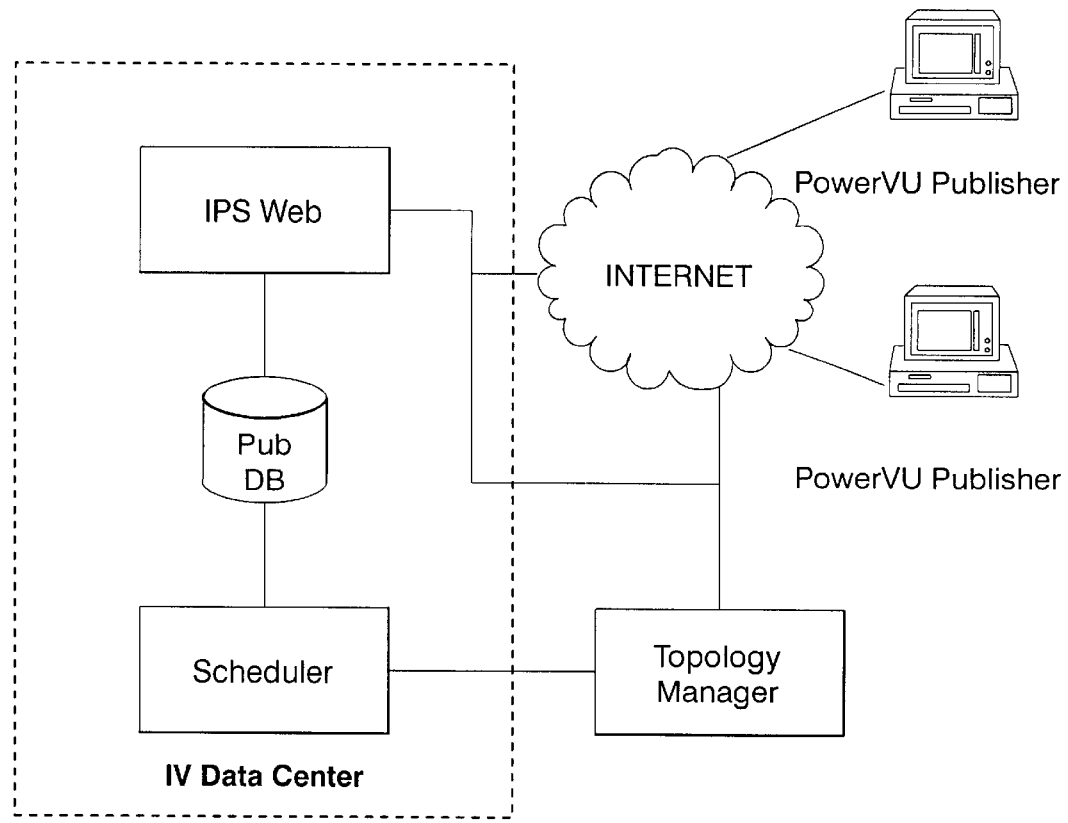
FIG. 6 is a block diagram illustrating another embodiment of a system constructed according to the invention.

In another embodiment, the Web server and Database server are located in different geographic locations and are connected using a high speed, reliable connection with appropriate security. Additional web servers can be added as publisher volume increases. These servers may be added in a central location, or distributed across the system network. A round robin DNS technique may be used to load share Web traffic. See FIG. 6.

The IPS Web is constructed using IIS 4.0 Active Server Pages. In order to create a transactional site, which maintains session information from page to page, Active Server Pages stores a single cookie in the user's browser during a session.

This cookie serves as a key to server based session information that can contain user and session variables, as well as database connection information. This cookie is deleted when the user exits the browser, or the session inactivity timeout (default value of 20 minutes), is reached. An additional persistent cookie can optionally be stored on the user machine which speeds the login process.

Scheduler System

The Scheduler System performs the event scheduling when a publisher schedules an event (broadcast), provides information about event schedules, and tracks events as they take place. The Scheduler System also includes an administrator interface for use by personnel in administrating the system.

The scheduler system maintains a database of all scheduled events, public and private. When a publisher wishes to schedule an event they interact with the scheduler system through the web pages on the PowerVU web site Publishers may schedule either free or paid for events. The scheduler system may limit the amount of system bandwidth available for free broadcasts to a given percentage of the total network bandwidth. If there is insufficient bandwidth available at the time desired, the system will suggest possible alternate times where bandwidth is available.

When events are scheduled, additional time (system configurable) before and after the event are reserved for setup and presentation overruns. These time periods may be set (on a system wide basis) by the administrator.

Users may be restricted by their billing plans as to how far in advance they may schedule a broadcast and how many resources they are allowed to reserve.

When the event is scheduled, the scheduler system coordinates with the Topology Manager to create the URL for the broadcast and reserve the system resources. This URL is provided to the publisher so that he can give it to potential viewers so they can access the broadcast at presentation time.

Events are usually scheduled in advance. The publisher then disconnects and reconnects when he is ready to do the broadcast. The publisher must reconnect with the system far enough in advance to allow time for uploading the slides and setting up the presentation. The publisher will be advised of this when the broadcast is scheduled (e.g., via e-mail).

When the user is ready to begin the broadcast the Scheduler System notifies the Topology, Manager to setup and start the event.

In one embodiment, the scheduler system is not responsible for providing any type of viewer guide to scheduled events, either public or private. In this case, this functionality will be provided other network components. The events are stored in a database table.

The Administration Interface is provided for use by administration personnel. The administrator can perform the following functions: view current schedules by day, week or month showing number of free and stream hours scheduled; view and ability to edit the threshold values of maximum stream hours available at any interval. This allows administrators to reserve bandwidth for major events.

The Scheduler provides the web interfaces for users and administration as well as the underlying database application to schedule network usage. In addition the bandwidth scheduler interfaces to the broadcast topology manager. The Scheduler is an application responsible for the following:

Event Scheduling when a Publisher requests an event time.

Notification to the system Network when a Publisher begins a presentation. This notification is made to the Topology Manager subsystem.

Administration of Scheduler parameters such as bandwidth capacity, and number of free presentations allowed per time segment.

The Scheduler communicates with the IPS Publisher's Web through the Sybase database located at the Data Center. The Scheduler communicates with the network Topology Manager via the Scheduler System Agent, a middle-tier application used to field requests and responses to and from the web-based scheduling components (ASP objects).

The reservation database consists of several tables in the Sybase database, used to store stream hour reservations by time segment for scheduled events, and other information about the system. This is the primary data source used to determine whether an event can be scheduled at a requested time.

When events are scheduled, a defined period both before and after the event is reserved to allow for initial setup time, and presentation overruns. These time periods, called EventStartPadTime and EventEndPadTime, are configurable in the System table.

The InterVU Publisher System (IPS) contains an HTML based Calendar that the Publisher uses to select an event time Two functions are performed during event scheduling: First, the event is reserved in the Sybase database, and, second, the system network Topology Manager is notified of the event so that network resources can be assigned. Below are more detailed descriptions of the interaction between system components during the scheduling process.

Active Server Page scripts process the request, and a check is made in the Reservation database.

The check for availability of time is done by taking all the 15 minute intervals in the scheduled event (including the EventStartPadTime and EventEndPadTime), and looking in TimeSlots for existing intervals which would be overbooked (according to the thresholds in the Capacity table), if the event was scheduled then. If any interval would be overbooked, the reservation would fail.

If no record exists for the specified interval, and other existing intervals are not overbooked, a record for the new interval is inserted when the stream hour counters in the existing records are incremented.

The Topology Manager must create file space, and assign a URL for the PowerVU presentation. It does this at the time that the presentation is scheduled.

To communicate the request for system resources to the Topology Manager, the Event Reservation script will write a Web Request record to the EventMsg table. This table is scanned by the Scheduling System Agent for both outgoing Web Request messages, and incoming Response messages from Topology Manager. The Scheduler System Agent, therefore, acts as the arbitrator between the Topology Manager messaging system and the Active Server Page reservation system.

As Web Request messages are processed by the Scheduler System Agent, mail messages are sent to the Topology Manager's mailslot.

When the Scheduler System Agent has completed processing of Web Request messages, it scans again for Response Messages received at its own mailslot, typically following the form.

Messages received from Topology Manager are written back to the EventMsg table as Response messages. Additionally, if a "WebReturn" message returns successfully from Topology Manager, it should include the newly allocated URL for the scheduled event. This URL will be stored in the corresponding event record in the Events table of the Sybase database.

The Active Server Page reservation script will be periodically checking for response messages in the EventMsg table. If a response message is received matching the EventID, the user will received notification that their event was accepted and scheduled as planned. The URL for the event will be included in the notification page. This is returned to the Publisher so that they can notify their users about the upcoming event.

An event may be scheduled weeks in advance of presentation time. Eventually, the Publisher will return to their presentation, and start it. The user interface leading to the setup of a presentation on the InterVU directs the user to a Web page set up on the Publisher System. At this point, the Scheduler System notifies the Topology Manager, via the Scheduling System agent, about the event.

From Powerpoint, the Publisher selects the Begin Broadcast option. This option automatically jumps them to the PowerVU event site, from which information from their local machine will be gathered and submitted to an Active Server Page to start the event.

From the StartEvent ASP, a "ResReq" record is written to the EventMsg table. The Scheduler System agent forward the Resource Request to the Topology Manager. From here, the Topology Manager makes the appropriate connections between the Publisher machine (or encoding machine), and the InterVU network. The Topology Manager returns connection information to the Scheduler System Agent in a "ResReturn" message. This information is scanned by the StartEvent ASP and passed back to the publisher's browser so that broadcast setup can continue.

Firewall Tunnel

The firewall tunnel may be required because of the way the NetShow server sets up connections between the server and the publisher. These connections are made from the server to the publisher. These types of unsolicited connections are normally blocked by firewalls.

The firewall tunnel consists of two components, a client and a server. The purpose of these components is to effectively reverse the connection so that the tunnel client running on the publisher's system connects out through the firewall to the tunnel server. Once this connection is established, it can be used to pass the data between the publisher's machine and the video server.

Even outbound connects may be blocked by a firewall. For this reason the firewall tunnel will try various techniques in an attempt to find a connection that is allowed. Note that the tunnel does not "break" through a firewall. It attempts to find a connection method that is permitted by the particular firewall in use and makes that connection in the direction normally allowed by the firewall. It does not introduce any security risks into the user's network.

The firewall tunnel is transparent to the user in its operation. In the event that a connection can not be established, the user is notified and directed to a web page that offers suggestions on how to configure a firewall to allow the broadcasts.

PowerPoint—PowerVU Interface

The following section describes the user application interface. PowerVU provides a presenter the ability to broadcast a PowerPoint presentation that includes audio, video or audio and video over the Internet. To establish a connection, the "global.js" file is generated by PowerPoint when the user selects to scheduled a Broadcast. The location of this file is passed to the broadcast service provider selected by the user.

The global.js file contains data required to schedule, identify the publisher, and a multitude of additional information pertaining to the broadcast. When the publisher selects to schedule a broadcast from PowerPoint, the location of this file is generated and passed to PowerVU through microsoft.com. This file remains on the user's system and is used by the PowerVU client side JavaScripts.

Set Up & Schedule A Broadcast

A dialog box allows the publisher to enter a title, description, speaker, and email contact name on the Description tab.

Schedule Broadcast—Options

The Schedule Broadcast Options tab defines a variety of ancillary options such as including audio and video with the publisher's presentation, forms of audience feedback, event recording options and server options. The publisher selects the "Server options" button to define a $3^{rd}$ party provider for the broadcast.

Set Up Lease Provider Time

On the Server Option dialog, the publisher selects "Lease time from a NetShow service provider" which initiates an IE4 browser and connects to the Microsoft Powercast web site, from which the user selects PowerVU.

Select Provider from IE4.0

After the publisher has entered data defining the presentation attributes in PowerPoint, and the user has selected to go to a web based presentation (Lease NetShow services), the user will click the Schedule Broadcast button. Power-Point will do the following: PowerPoint will create a subdirectory in the shared path that is based on the user name and schedule time.

PowerPoint will store template files including global.js and the basic lobby.htm file. PowerPoint will launch the microsoft.com based vendor selection page with the local path to the stored templates. That web page will launch to a URL, provided by the selected vendor, and pass the local path as a parameter. When the publisher selects the PowerVU hyperlink, the user is traversed to the PowerVU website where the membership account is begun.

All publishers arrive at the PowerVU home page the first time they visit the PowerVU site. After setting up a publisher's subscriber membership account, the publisher could elect to save his/her login information as a "cookie" residing on his/her local system, which would cause subsequent visits to the PowerVU URL to traverse the user directly to the Publisher's workroom. The publisher's system must have the ability to accept an ActiveX control in order to use PowerVU as a $3^{rd}$ party PowerCast provider. At certain points, the user will be requested to receive an ActiveX control. In general, the publisher must accept the control to facilitate the broadcast.

Schedule Broadcast

The following is a description of the steps the PowerVU scheduling web site will perform internally when a publisher requests to schedule a broadcast. Following this bulleted description is a detailed description including the displays the publisher will encounter.

The PowerVU site will identify the user as a customer or allow the user to create an account (as previously described).

The PowerVU site will assign a unique ID for each scheduled broadcast and store it in the event database at InterVU.

The PowerVU site will return a web URL to the user that must be distributed to the viewers of the presentation. The site will be created with a default lobby page.

The URL of the event page is emailed to the publisher.

The publisher has already completed the following steps to begin the scheduling process for the broadcast.

1. The publisher selects "Set up and schedule a new broadcast" from within PowerPoint, then selects the OK button, thus initiating the PowerPoint. Schedule a New Broadcast dialog.
2. On the Server Option dialog, the publisher selects "Lease time from a NetShow service provider." The publisher then selects the "Schedule Broadcast" button on the Server Option dialog, which initiates an IE4 browser and connects to the Microsoft PowerCast web site, from which the user selects PowerVU.
3. The publisher has already established a PowerVU account and selected to always trust PowerVU for the passing of the global.js file between the PowerVU site and the publisher's local system. If the publisher also elected to save his/her login information, the publisher is. traversed directly to the Schedule Broadcast, bypassing the PowerVU home page where login takes place.

At this point, the values of the global.js file are made known to the publisher's browser. The location of the local global.js file is passed to the PowerVU site.

Schedule Broadcast—Step 1

The Broadcast Name (<name>) is populated using the data in the global.js file. The publisher enters the quantity of seats they would like during the broadcast and then selects start and end dates and times from the drop down combo objects. These objects behave and appear in a similar manner as those found in Microsoft Outlook when scheduling a meeting. The publisher then selects the Next button to continue the scheduling process. At this point, PowerVU requests the duration and seats requested. If the time slot or seat quantity is not available, the publisher remains on Step 1 in the scheduling process and the publisher is notified from within the existing Step 1 page of the reason why the scheduling is not acceptable. The publisher is provided with the closest date and/or time slot for the quantity of seats requested and can then select those dates from the drop down combo objects. The process is completed by the publisher selecting the Next button and is then traversed to Step 2.

Schedule Broadcast—Step 2.

All information previously entered is displayed to the publisher on the Step 2 page as well as the calculated total broadcast duration, and total stream hours that the broadcast will use. Options previously selected in PowerPoint such as Send Audio, Send Video, Viewer Feedback, Interactive Chat, and Viewers Access Publisher's Notes are displayed, but are modified in the PowerPoint dialogs that lead to the PowerVU scheduling pages. All values are passed to the Schedule Broadcast pages using the data in the global.js file. The publisher has unique options settings including whether the broadcast is public or private, for private broadcasts, security level settings, and for public broadcasts, whether the publisher would like to publish the broadcast in EV-Guide as previously mentioned on the PowerVU home page. The "Use Firewall Tunnel" radio option buttons enable the user behind a firewall to broadcast a presentation across the Internet. The default setting is "No," and when the publisher selects the "Finish" button a firewall test is performed to verify that the publisher can publish the broadcast across the Internet. If the test fails, the publisher remains on the Step 2 page and is notified in a text block (same method as in Step 1 scheduling time slot) that the "Use Firewall Tunnel" must be set to "Yes" to publish across the Internet. The user then selects "Yes" for "Use Firewall Tunnel," and again selects "Finish." If the test succeeds, the Broadcast Scheduling Complete page displays. If the test fails, a Scheduling a Broadcast Help page displays. This help page assists the publisher and the publisher's MIS personnel in determining a suitable PowerVU firewall configuration.

Schedule Broadcast—Complete

When the publisher selects "Finish" on Step 2 of scheduling a broadcast, the broadcast's static html page and directory structure is created on the PowerVU server, the broadcast scheduling information is written into the global.js and placed in that same directory. The Schedule Broadcast Is Complete page is displayed to the publisher providing all information previously defined. Other instructional information is also provided, as well as links to Broadcast Tools, the PowerVU home page, and closing of the PowerVU scheduling session (Back to PowerPoint) which terminates the browser window used in the scheduling process.

Notifying Viewers of Broadcast

The publisher is responsible for notifying viewers of the URL address, date and time of the broadcast. This could be accomplished via email and may be a manual process performed by the publisher.

Broadcast Tools

The user is traversed to the Broadcast Tools from the PowerVU home page after log in, or from any of the scheduling pages. The user can also arrive at Broadcast Tools after completing the New Account and New Publisher setup pages.

The publisher is presented the current membership information, including accounting information and publisher names. The publisher can also see at a glance the current broadcast(s) he/she has scheduled. An area on the page is also provided for InterVU/PowerVU notice information. If the publisher is an account manager, all broadcasts scheduled by all publishers are displayed.

Begin Broadcast—Publisher

The following is a description of the steps the PowerVU scheduling web site will perform internally when beginning a PowerVU broadcast. Following this bulleted description is a detailed description including the displays the publisher will encounter. Selecting the "Begin" menu button for a previously scheduled PowerVU presentation will launch to a microsoft.com based web site.

The PowerVU site will do the following:

The PowerVU site will identify the customer from a cookie, if no cookie exists, the publisher must log in.

The resource requirements will be retrieved from the InterVU database and passed to the InterVU network topology manager using ASP technology when the "Start" button on the ActiveX control is selected. The topology manager will configure the network for the broadcast and return the connection information to the ActiveX control. This will establish the ASF stream path through the firewall tunnel, from the encoder to the NetShow servers.

When the publisher selects the "Transfer Files" button, the ActiveX control will FTP transfer the presentation documents from the local path to the presentation URL site.

When the publisher selects the "Check Microphone" button, the ActiveX control will perform a microphone check When the publisher selects the "Check Camera" button, the ActiveX control will perform a closed loop video check for the user.

When the publisher selects the "Connect Network" button, the ActiveX control will connect all of the network components.

When the user clicks the "Start" button, the PowerVU site will signal PowerPoint to start the presentation.

At the presenters option, the PowerVU Active X control will open a stay-on-top dialog box that will display viewer connection and timing information to the presenter. This dialog will have an end presentation button. When the presenter clicks this button, both PowerPoint and the PowerVU site will be informed.

In one embodiment, the publisher must begin a broadcast from within PowerPoint. This enables PowerVU to begin the downloading process of the broadcast from the publisher's local system to the PowerVU server and ensures PowerPoint and the broadcast are ready to go.

When the publisher has elected to begin the broadcast from PowerPoint, PowerPoint initiates a browser window from which the publisher selects the PowerCast provider used during the initial scheduling of the broadcast. The publisher selects PowerVU and the Begin Broadcast page displays for the publisher to log in to. After positive confirmation, the publisher is presented with an ActiveX control in a dialog window.

The Begin Broadcast Preparation dialog displays the broadcast time duration, the date, and the days, hours, minutes, and seconds before the scheduled broadcast begin time. The publisher transfers the broadcast presentation files to the PowerVU site prior to broadcast commencement. This can be accomplished at any time after scheduling because the location for the files is created at scheduling time. If the presentation has been transferred previously, the Broadcast Transferred to PowerVU field is marked with Yes, and the date and time of the transfer is displayed. If the presentation has never been transferred, Broadcast Transferred to PowerVU field is marked with No, and the Broadcast Transferred On label and field are not visible to the publisher. Presentation files can be transferred multiple times if the publisher has modified the presentation.

The publisher transfers the files by selecting the Transfer Files button on the Begin Broadcast Preparation dialog. This begins an FTP transfer of the presentation from the publisher's local system to the PowerVU network system. The publisher can view the progress of individual files using the Current File progress gauge, and the entire presentation's progress with the Total progress gauge. The transfer progress gauges are visible during the transfer process. When the transfer is complete, the Broadcast Transferred To PowerVU field is marked with Yes and the date and time is noted below.

Begin Broadcast—Preparations

The publisher may elect to check their microphone, and when completed, this label displays a check mark. The Camera Check behaves in a like manner. The publisher can also perform a PowerVU Network Test by selecting the Connect Network button. This test checks the network from "end to end," ensuring that all client and PowerVU network communications are intact and functioning properly. After this test is completed successfully, the PowerVU Network Test label is marked with a check mark.

The publisher then selects the Start button to begin the broadcast. Doing so initiates the Broadcast "Stay on Top" dialog.

The dialog identifies the quantity of viewers currently logged in, and the elapsed, remaining, and reserved time of the broadcast. The publisher can manually end the broadcast by selecting the End Broadcast button. A broadcast will terminate automatically at the end of the scheduled broadcast as allocated during scheduling and/or when the allotted reserve time has been exceeded. This dialog can be hidden from the display by selecting the Hide button or selecting F5 on the keyboard. The dialog can be re-displayed by selecting F5 again. When a broadcast overruns the scheduled time, the publisher's pre-paid stream-hours may also be overrun. When an overrun occurs, the "ON AIR" field displays "Stream-hour overrun at $0.00 per minute." If the publisher is paying with a subscription plan or credit card, their account will automatically be billed for the overrun. If the publisher pre-paid for the broadcast or the amount exceeds the publisher's purchase order, the publisher will be billed for the overrun time. When the broadcast is complete, all data pertaining to the broadcast can be removed from the PowerVU server without the publisher's intervention.

Begin Broadcast—Viewer

The viewer of a PowerVU presentation has been notified via email by the publisher. The viewer has been sent an URL of the broadcast as well as a date and time. The viewer initializes the URL in a version 3.x web browser and is presented with an event lobby page generated by PowerPoint at broadcast scheduling time. At broadcast commencement, the viewer is automatically traversed to the event (presentation page). If the publisher has elected to transmit audio, video, publisher's notes, and interactive chat, these features are made evident to the viewer as well.

Alternatively, the viewer may have the ability to view a public broadcast listing from the PowerVU home page (EV-Guide listing). The viewer could select a public broadcast to find out more information.

While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. Thus, the specific structures and methods discussed in detail above are merely illustrative of a few specific embodiments of the invention.

What is claimed is:

1. A method of broadcasting at least one data stream over a data network, comprising the steps of:

scheduling a broadcast of at least one data stream over a data network to a plurality of recipients;

allocating network resources for the broadcast;

setting up network interconnections for the broadcast; and automatically tracking at least one operation of at least one component in the data network to detect a component failure and, in response to a detected component failure, modifying network interconnections.

2. The method of claim 1 wherein the allocating step further comprises the step of monitoring usable resources to determine which resources may be allocated.

3. The method of claim 1 wherein the allocating step further comprises the step of tracking current data streams in the data network.

4. The method of claim 1 wherein the allocating step further comprises the steps of tracking current data streams in the data network and tracking resources that are used by the current data streams.

5. The method of claim 1 further comprising the step of determining whether resources are available in order to determine whether a recipient may receive the data stream.

6. A method of broadcasting at least one data stream over a data network, comprising the steps of:
- scheduling a broadcast of at least one data stream over a data network to a plurality of recipients;
- automatically allocating network resources for the broadcast; and
- automatically tracking at least one operation of at least one component in the data network to detect a component failure and, in response to a detected component failure, modifying network interconnections.

7. The method of claim 6 further comprising the step of setting up network interconnections to support the broadcast.

8. The method of claim 6 wherein the automatically allocating step further comprises the step of monitoring usable resources to determine which resources may be allocated.

9. The method of claim 6 wherein the automatically allocating step further comprises the step of tracking current data streams in the data network.

10. The method of claim 6 wherein the automatically allocating step further comprises the steps of tracking current data streams in the data network and tracking resources that are used by the current data streams.

11. The method of claim 6 further comprising the step of determining whether resources are available in order to determine whether a recipient may receive the data stream.

12. A system for broadcasting at least one data stream over a data network, the system comprising:
- a plurality of user terminals adapted to communicate with the data network;
- a server adapted to communicate with the data network for providing at least one data stream over the data network;
- a scheduler for scheduling a broadcast of the at least one data stream over the data network to the user terminals; and
- at least one topology manager for allocating network resources, setting up network interconnections for the broadcast, and modifying the network interconnections upon detecting component failures.

* * * * *